United States Patent
Kapoor

(10) Patent No.: US 12,236,381 B1
(45) Date of Patent: Feb. 25, 2025

(54) COMPUTERIZED WORK-ITEM SELECTION AND PROGRESS TRACKING BASED ON A SET OF QUANTIFIED COMPUTER-EXECUTABLE RULES

(71) Applicant: Digital.ai Software, Inc., Burlington, MA (US)

(72) Inventor: Rahul Kapoor, Bellevue, WA (US)

(73) Assignee: Digital.ai Software, Inc., Burlington, MA (US)

( * ) Notice: Subject to any disclaimer, the term of this patent is extended or adjusted under 35 U.S.C. 154(b) by 704 days.

(21) Appl. No.: 17/535,411

(22) Filed: Nov. 24, 2021

(51) Int. Cl.
*G06Q 10/0637* (2023.01)
*G06Q 10/0631* (2023.01)

(52) U.S. Cl.
CPC .......... *G06Q 10/06375* (2013.01); *G06Q 10/063112* (2013.01); *G06Q 10/063114* (2013.01); *G06Q 10/06316* (2013.01)

(58) Field of Classification Search
CPC ..... G06Q 10/06375; G06Q 10/063112; G06Q 10/063114; G06Q 10/06316
See application file for complete search history.

(56) References Cited

U.S. PATENT DOCUMENTS

| 8,463,591 | B1 | 6/2013 | Chang et al. | |
| 2004/0186905 | A1* | 9/2004 | Young | H04L 67/51 709/225 |

(Continued)

FOREIGN PATENT DOCUMENTS

CN 109347536 A 2/2019

OTHER PUBLICATIONS

Trieflinger, Stefan, et al., How to Prioritize Your Product Roadmap When Everything Feels Important: A Grey Literature Review, IEEE International Conf on Engineering, Technology and Innovation (ICE/ITMC), Jun. 2021, 9 pages, [retrieved on Sep. 25, 2024], Retrieved from the Internet: <URL:http://ieeexplore.ieee.org/>.*

(Continued)

*Primary Examiner* — Geoffrey R St Leger
(74) *Attorney, Agent, or Firm* — Rahman LLC

(57) ABSTRACT

Generating an output prioritized list of computerized work-items for prioritizing work based on a set of quantified computer-executable rules includes a structured way of associating contributions and expenses with computerized work-items and enhancing current technological processes of selecting computerized work-items to meet quantified computer-executable rules. The method includes determining a priority order of each sub-component based on quantified computer-executable rules associated with those sub-components, generating tuples having sub-components for each computerized work-item that are arranged based on the priority order, sorting the computerized work-items in descending order of the tuples, and traversing the sorted list of computerized work-items to generate the output prioritized list of computerized work-items for prioritizing work based on quantified computer-executable rules. The method provides the ability of tracking progress of the computerized work-items using standardized or comparable bucket values and measuring progress against the quantified computer-executable rules.

30 Claims, 12 Drawing Sheets

(56) References Cited

U.S. PATENT DOCUMENTS

| | | |
|---|---|---|
| 2006/0190944 A1 | 8/2006 | Moon et al. |
| 2007/0174161 A1 | 7/2007 | Bullock et al. |
| 2008/0196000 A1 | 8/2008 | Fernandez-Ivern et al. |
| 2011/0087522 A1 | 4/2011 | Beaty, II et al. |
| 2015/0006260 A1 | 1/2015 | Harris |
| 2017/0200133 A1 | 7/2017 | Werner et al. |
| 2020/0159525 A1 | 5/2020 | Bhalla et al. |
| 2021/0174274 A1* | 6/2021 | Nair ................. G06F 18/24147 |
| 2022/0027830 A1 | 1/2022 | Mouawad |
| 2022/0130272 A1* | 4/2022 | Foroughi ................. G09B 7/00 |

OTHER PUBLICATIONS

A System to Prioritize Work for User Driven by Business Objectives, IBM Technical Disclosure, 2008, 3 pages, [retrieved on Sep. 25, 2024 ], Retrieved from the Internet: <URL:http://ip.com/>.*

SAFe, Scaled Agile, "Weighted Shortest Job First," https://www.scaledagileframework.com/wsjf/, Feb. 10, 2021, 6 pages.

Lee, T., et al., "Gravitational Search Algorithm Optimization for Bi-Objective Flow Shop Scheduling using Weighted Dispatching Rules," 2017 7th IEEE International Conference on Control System, Computing and Engineering (ICCSCE), Penang, Malaysia, Nov. 24-26, 2017, pp. 127-132.

Land, S., et al., "Lean Six Sigma Techniques and DMAIC," in Practical Support for Lean Six Sigma Software Process Definition: Using IEEE Software Engineering Standards, IEEE, 2008, pp. 173-231, doi: 10.1002/9780470289969, ch7, pp. 173-231.

* cited by examiner

OBTAINING A DEFAULT PRIORITY ORDER OF (I) A PLURALITY OF CONTRIBUTION SUB-COMPONENTS AND (II) A PLURALITY OF EXPENSE SUB-COMPONENTS THAT ARE ASSOCIATED WITH THE INPUT MASTER LIST OF THE PLURALITY OF COMPUTERIZED WORK-ITEMS, A BUCKET CATEGORY TO NUMERICAL VALUE MAP THAT COMPRISES MAPPING OF A BUCKET CATEGORY ASSOCIATED WITH THE PLURALITY OF CONTRIBUTION SUB-COMPONENTS AND EXPENSE SUB-COMPONENTS TO A NUMERICAL VALUE, A PLURALITY OF RESOURCE CATEGORIES, A MAXIMUM RESOURCE UNIT LIMIT FOR EACH OF THE PLURALITY OF RESOURCE CATEGORIES, AND THE SET OF QUANTIFIED COMPUTER-EXECUTABLE RULES, WHEREIN EACH CONTRIBUTION SUB-COMPONENT ASSOCIATED WITH A COMPUTERIZED WORK-ITEM HAS A CONTRIBUTION AMOUNT THAT COUNTS TOWARDS A CONTRIBUTION THRESHOLD UPON COMPLETION OF THE COMPUTERIZED WORK-ITEM AND EACH EXPENSE SUB-COMPONENT HAS AN EXPENSE AMOUNT THAT COUNTS TOWARDS A EXPENSE THRESHOLD UPON COMPLETION OF THE COMPUTERIZED WORK-ITEM

402

CONVERTING EACH OF THE PLURALITY OF CONTRIBUTION SUB-COMPONENTS AND EXPENSE SUB-COMPONENTS THAT ARE ESTIMATED IN BUCKETS INTO A COMPONENT NUMERICAL VALUE USING THE BUCKET CATEGORY TO NUMERICAL VALUE MAP

404

FIG. 4A

DETERMINING A PRIORITY ORDER OF EACH OF THE PLURALITY OF CONTRIBUTION SUB-COMPONENTS AND THE PLURALITY OF EXPENSE SUB-COMPONENTS BASED ON THE SET OF QUANTIFIED COMPUTER-EXECUTABLE RULES CORRESPONDING TO THE PLURALITY OF CONTRIBUTION SUB-COMPONENTS AND EXPENSE SUB-COMPONENTS, WHEREIN A CONTRIBUTION SUB-COMPONENT OR EXPENSE SUB-COMPONENT AT THE TOP IN THE PRIORITY ORDER CORRESPONDS TO A SET OF QUANTIFIED COMPUTER-EXECUTABLE RULES HAVING HIGHEST PRIORITY AMONG THE PLURALITY OF CONTRIBUTION SUB-COMPONENTS OR EXPENSE SUB-COMPONENTS THAT ARE ASSOCIATED WITH PRIORITIZED SET OF QUANTIFIED COMPUTER-EXECUTABLE RULES AND A CONTRIBUTION SUB-COMPONENT OR EXPENSE SUB-COMPONENT WITH EITHER (I) NON-PRIORITIZED SET OF QUANTIFIED COMPUTER-EXECUTABLE RULES OR (II) NO ASSOCIATED SET OF QUANTIFIED COMPUTER-EXECUTABLE RULES IS ASSIGNED A LOWER PRIORITY THAN THE PLURALITY OF CONTRIBUTION SUB-COMPONENTS OR EXPENSE SUB-COMPONENTS THAT ARE ASSOCIATED WITH PRIORITIZED SET OF QUANTIFIED COMPUTER-EXECUTABLE RULES, WHEREIN THE LOWER PRIORITY IS DERIVED FROM THE DEFAULT PRIORITY ORDER
406

GENERATING A PLURALITY OF TUPLES COMPRISING CONTRIBUTION SUB-COMPONENTS AND EXPENSE SUB-COMPONENTS FOR EACH OF THE PLURALITY OF COMPUTERIZED WORK-ITEMS OF THE INPUT MASTER LIST, WHEREIN THE CONTRIBUTION SUB-COMPONENTS AND THE EXPENSE SUB-COMPONENTS IN THE TUPLE ARE ARRANGED BASED ON THE PRIORITY ORDER
408

FIG. 4B

SHUFFLING TUPLES FOR ALL UNSELECTED COMPUTERIZED WORK-ITEMS OF THE SORTED LIST, BY MOVING THE SUB-COMPONENT THAT IS AT FIRST POSITION IN THE TUPLES TO THE END, UPON DETERMINING THAT CUMULATIVE CONTRIBUTION OF A CONTRIBUTION SUB-COMPONENT AT FIRST POSITION IN THE TUPLES FOR THE OUTPUT PRIORITIZED LIST OF COMPUTERIZED WORK-ITEMS EXCEEDS THE CONTRIBUTION THRESHOLD OR THE CUMULATIVE EXPENSE EXCEEDS THE EXPENSE THRESHOLD FOR A EXPENSE SUB-COMPONENT AT FIRST POSITION IN THE TUPLES
414

REPEATING STEPS 410 TO 414 UNTIL (I) THE CUMULATIVE RESOURCE UNITS REQUIRED FOR EACH RESOURCE CATEGORY TO COMPLETE THE OUTPUT PRIORITIZED LIST OF COMPUTERIZED WORK-ITEMS ARE GREATER THAN THE MAXIMUM RESOURCE UNIT LIMIT FOR EACH RESOURCE CATEGORY, OR (II) THE CUMULATIVE CONTRIBUTIONS FOR EACH OF THE CONTRIBUTION SUB-COMPONENTS IN THE OUTPUT PRIORITIZED LIST OF COMPUTERIZED WORK-ITEMS ARE MORE THAN THE CONTRIBUTION THRESHOLDS, OR (III) THE CUMULATIVE EXPENSES FOR EACH OF THE EXPENSE SUB-COMPONENTS IN THE OUTPUT PRIORITIZED LIST OF COMPUTERIZED WORK-ITEMS HAVE REACHED THE EXPENSE THRESHOLD OR (IV) COMPUTERIZED WORK-ITEMS IN THE SORTED LIST AVAILABLE FOR SELECTION HAVE BEEN EXHAUSTED
416

FIG. 4D

| CLIENT DEVICES | SOFTWARE DEVELOPMENT DEVICE |
| 102A-N | 110 |

OBTAINING A DEFAULT PRIORITY ORDER OF (I) A PLURALITY OF CONTRIBUTION SUB-COMPONENTS AND (II) A PLURALITY OF EXPENSE SUB-COMPONENTS THAT ARE ASSOCIATED WITH THE INPUT MASTER LIST OF THE PLURALITY OF COMPUTERIZED WORK-ITEMS, A BUCKET CATEGORY TO NUMERICAL VALUE MAP THAT COMPRISES MAPPING OF A BUCKET CATEGORY ASSOCIATED WITH THE PLURALITY OF CONTRIBUTION SUB-COMPONENTS AND EXPENSE SUB-COMPONENTS TO A NUMERICAL VALUE, A PLURALITY OF RESOURCE CATEGORIES, A MAXIMUM RESOURCE UNIT LIMIT FOR EACH OF THE PLURALITY OF RESOURCE CATEGORIES, AND THE SET OF QUANTIFIED COMPUTER-EXECUTABLE RULES, WHEREIN EACH CONTRIBUTION SUB-COMPONENT ASSOCIATED WITH A COMPUTERIZED WORK-ITEM HAS A CONTRIBUTION AMOUNT THAT COUNTS TOWARDS A CONTRIBUTION THRESHOLD UPON COMPLETION OF THE COMPUTERIZED WORK-ITEM AND EACH EXPENSE SUB-COMPONENT HAS AN EXPENSE AMOUNT THAT COUNTS TOWARDS A EXPENSE THRESHOLD UPON COMPLETION OF THE COMPUTERIZED WORK-ITEM ~502

CONVERTING EACH OF THE PLURALITY OF CONTRIBUTION SUB-COMPONENTS AND EXPENSE SUB-COMPONENTS THAT ARE ESTIMATED IN BUCKETS INTO A COMPONENT NUMERICAL VALUE USING THE BUCKET CATEGORY TO NUMERICAL VALUE MAP ~504

DETERMINING A PRIORITY ORDER OF EACH OF THE PLURALITY OF CONTRIBUTION SUB-COMPONENTS AND THE PLURALITY OF EXPENSE SUB-COMPONENTS BASED ON THE SET OF QUANTIFIED COMPUTER-EXECUTABLE RULES CORRESPONDING TO THE PLURALITY OF CONTRIBUTION SUB-COMPONENTS AND EXPENSE SUB-COMPONENTS, WHEREIN A CONTRIBUTION SUB-COMPONENT OR EXPENSE SUB-COMPONENT AT THE TOP IN THE PRIORITY ORDER CORRESPONDS TO A SET OF QUANTIFIED COMPUTER-EXECUTABLE RULES HAVING HIGHEST PRIORITY AMONG THE PLURALITY OF CONTRIBUTION SUB-COMPONENTS OR EXPENSE SUB-COMPONENTS THAT ARE ASSOCIATED WITH PRIORITIZED SET OF QUANTIFIED COMPUTER-EXECUTABLE RULES AND A CONTRIBUTION SUB-COMPONENT OR EXPENSE SUB-COMPONENT WITH EITHER (I) NON-PRIORITIZED SET OF QUANTIFIED COMPUTER-EXECUTABLE RULES OR (II) NO ASSOCIATED SET OF QUANTIFIED COMPUTER-EXECUTABLE RULES IS ASSIGNED A LOWER PRIORITY THAN THE PLURALITY OF CONTRIBUTION SUB-COMPONENTS OR EXPENSE SUB-COMPONENTS THAT ARE ASSOCIATED WITH PRIORITIZED SET OF QUANTIFIED COMPUTER-EXECUTABLE RULES, WHEREIN THE LOWER PRIORITY IS DERIVED FROM THE DEFAULT PRIORITY ORDER ~506

FIG. 5A

| CLIENT DEVICES 102A-N | SOFTWARE DEVELOPMENT DEVICE 110 |
|---|---|

GENERATING A PLURALITY OF TUPLES COMPRISING CONTRIBUTION SUB-COMPONENTS AND EXPENSE SUB-COMPONENTS FOR EACH OF THE PLURALITY OF COMPUTERIZED WORK-ITEMS OF THE INPUT MASTER LIST, WHEREIN THE CONTRIBUTION SUB-COMPONENTS AND THE EXPENSE SUB-COMPONENTS IN THE TUPLE ARE ARRANGED BASED ON THE PRIORITY ORDER — 508

SORTING THE PLURALITY OF COMPUTERIZED WORK-ITEMS OF THE INPUT MASTER LIST IN DESCENDING ORDER OF THE PLURALITY OF TUPLES TO OBTAIN A SORTED LIST OF COMPUTERIZED WORK-ITEMS — 510

TRAVERSING THE SORTED LIST OF COMPUTERIZED WORK-ITEMS TO GENERATE THE OUTPUT PRIORITIZED LIST OF COMPUTERIZED WORK-ITEMS FOR PRIORITIZING WORK BASED ON THE SET OF QUANTIFIED COMPUTER-EXECUTABLE RULES, WHEREIN COMPUTERIZED WORK-ITEMS ARE SELECTED DURING TRAVERSAL WHILE ENSURING (i) CUMULATIVE RESOURCE UNITS REQUIRED FOR EACH RESOURCE CATEGORY TO COMPLETE THE OUTPUT PRIORITIZED LIST OF COMPUTERIZED WORK-ITEMS ARE LESS THAN THE MAXIMUM RESOURCE UNIT LIMIT FOR EACH RESOURCE CATEGORY AND (ii) CUMULATIVE EXPENSES FOR EXPENSE SUB-COMPONENTS IN THE OUTPUT PRIORITIZED LIST OF COMPUTERIZED WORK-ITEMS ARE LESS THAN THE EXPENSE THRESHOLD — 512

SHUFFLING TUPLES FOR ALL UNSELECTED COMPUTERIZED WORK-ITEMS OF THE SORTED LIST, BY MOVING THE SUB-COMPONENT THAT IS AT FIRST POSITION IN THE TUPLES TO THE END, UPON DETERMINING THAT CUMULATIVE CONTRIBUTION OF A CONTRIBUTION SUB-COMPONENT AT FIRST POSITION IN THE TUPLES FOR THE OUTPUT PRIORITIZED LIST OF COMPUTERIZED WORK-ITEMS EXCEEDS THE CONTRIBUTION THRESHOLD OR THE CUMULATIVE EXPENSE EXCEEDS THE EXPENSE THRESHOLD FOR A EXPENSE SUB-COMPONENT AT FIRST POSITION IN THE TUPLES — 514

FIG. 5B

COMPUTERIZED WORK-ITEM SELECTION AND PROGRESS TRACKING BASED ON A SET OF QUANTIFIED COMPUTER-EXECUTABLE RULES

CROSS-REFERENCE TO RELATED APPLICATIONS

This application is related to U.S. patent application Ser. No. 17/535,370, filed Nov. 24, 2021, entitled "Computerized Work-Item Selection and Progress Tracking Based on a Set of Prioritized Computer-Executable Rules" and U.S. patent application Ser. No. 17/535,388, filed Nov. 24, 2021, entitled "Computerized Work-Item Selection and Progress Tracking Based on a Set of Weighted Computer-Executable Rules", the complete disclosures of which, in their entireties, are herein incorporated by reference.

BACKGROUND

Technical Field

The embodiments herein generally relate to techniques for generation of a prioritized list of computerized work-items for prioritizing computer application workflow based on a set of quantified computer-executable rules.

Description of the Related Art

In current generation software development tools, it is very hard to associate outcomes of various objectives of an organization with computerized work-items such as features, defects, or technical debt being planned or prioritize computerized work-items based on overall objectives of the organization, as the desired objectives are not tracked in software development tools and computerized work-items do not have any association with the objectives. Typically, computerized work-item selection is based on priority, size, and available resources where priority attempts to capture customer and organization value in an ad hoc fashion. The reason the setting of priority is somewhat ad hoc is that it is hard to quantify the impact of a computerized work-item towards the objectives of the organization. Similarly, once computerized work-items are being executed on, progress is typically measured by tracking outputs, for example, features shipped, defects resolved, or story points completed and there is no connection to the desired outcomes of the organization like increase in revenue or product adoption or customer satisfaction. The aforementioned problem exists not just in software development teams but for any unit that has to work on various computerized work-items within an organization.

The large number of computerized work-items having multiple contribution and expense sub-components, and the need for multiple resources from a plurality of different resource categories to complete the computerized work-items means that any intelligent method to create a prioritized list of computerized work-items based on quantified computer-executable rules and resource type/limit considerations would be computationally challenging.

In an existing approach, a weighted shortest job first (WSJF) method is used optimize computerized work-items or collections of computerized work-items based on a score defined to be the "cost of delay" divided by "job duration", where the "cost of delay" is "cost of delay per unit time" multiplied by "delay duration" where "delay duration" is the sum of durations of preceding Job's. A modification of the WSJF method approximates "job duration" as "job size" & "cost of delay" as the sum of "user business value"+"time criticality"+"risk reduction and/or opportunity enablement". There is however no decomposition of contributions and expenses associated with a quantified objective into constituent sub-components, or even a clear distinction between contribution sub-components and expense sub-components. As there is no association of granular contributions and expenses with computerized work-items, the selection of computerized work-items is primarily driven by an estimate of the cost of not doing the computerized work-items versus based on a more holistic consideration of an organization's objectives. Further, the modification of the WSJF does not consider different resource categories, nor does it try to minimize resources or computerized work-items while meeting an organization's objectives.

Accordingly, there arises a need to address the aforementioned technical drawbacks in existing technologies for generation of a prioritized list of computerized work-items for prioritizing work based on a set of quantified computer-executable rules.

SUMMARY

In view of the foregoing, an embodiment herein provides one or more non-transitory computer readable storage medium storing a sequence of instructions, which when executed by a processor, causes processing of an input master list of a plurality of computerized work-items to generate an output prioritized list of the plurality of computerized work-items selected from the input master list, for prioritizing work based on a set of quantified computer-executable rules, said sequence of instructions comprising (a) obtaining a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item, (b) converting each of the plurality of contribution sub-components and expense sub-components that are estimated in buckets into a component numerical value using the bucket category to numerical value map, (c) determining a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with prioritized set of quantified computer-executable rules and a contribution sub-component or expense sub-component with either (i) non-prioritized set of quantified computer-executable rules or (ii) no associated set of quantified computer-executable rules is assigned a lower priority than the plurality of contribution sub-components or expense sub-components that are associated with prioritized set of quantified computer-executable rules, wherein the lower priority is derived from the default priority order, (d) generating a plurality of tuples comprising contribution sub-components and expense sub-components for each of the plurality of computerized work-items of the input master list, wherein the contribution sub-components and the expense sub-components in the tuple are arranged based on the priority order, (e) sorting the plurality of computerized work-items of the input master list in descending order of the plurality of tuples to obtain a sorted list of computerized work-items, (f) traversing the sorted list of computerized work-items to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold, (g) shuffling tuples for all unselected computerized work-items of the sorted list, by moving the sub-component that is at first position in the tuples to the end, upon determining that cumulative contribution of a contribution sub-component at first position in the tuples for the output prioritized list of computerized work-items exceeds the contribution threshold or the cumulative expense exceeds the expense threshold for an expense sub-component at first position in the tuples, and (h) repeating steps (e) to (g) until (i) the cumulative resource units required for each resource category to complete the output prioritized list of computerized work-items are greater than the maximum resource unit limit for each resource category, or (ii) the cumulative contributions for each of the contribution sub-components in the output prioritized list of computerized work-items are more than the contribution thresholds, or (iii) the cumulative expenses for each of the expense sub-components in the output prioritized list of computerized work-items have reached the expense threshold or (iv) computerized work-items in the sorted list available for selection have been exhausted.

In some embodiments, the non-transitory computer readable storage medium storing the sequence of instructions, have one uniform resource category with the plurality of computerized work-items having an estimate specified in number of resources.

In some embodiments, the non-transitory computer readable storage medium storing the sequence of instructions, have one uniform resource category with the plurality of computerized work-items having an estimate specified in time units.

In some embodiments, the non-transitory computer readable storage medium storing the sequence of instructions, which when executed by the processor, further causes determining a minimum number of computerized work-items that satisfy the set of quantified computer-executable rules by (a) initializing the minimum number of required computerized work-items to total number of computerized work-items, (b) performing a plurality of iterations of steps (d) to (h) of the first embodiment, wherein each of the plurality of iterations is performed with a distinct priority order that is selected from all possible priority orders of the plurality of contribution sub-components and the plurality of expense sub-components, until a number of required computerized work-items for that iteration exceeds the minimum number of required computerized work-items, (c) updating the minimum number of required computerized work-items based on each completed iteration, (d) obtaining the minimum number of required computerized work-items after all iterations corresponding to all possible priority orders have completed, and (e) obtaining the list of prioritized computerized work-items for the iteration that resulted in the minimum number of required computerized work-items.

In some embodiments, the non-transitory computer readable storage medium storing the sequence of instructions, which when executed by the processor, further causes determining a set of computerized work-items requiring the minimum engineering resources that satisfy the set of quantified computer-executable rules by (a) initializing the minimum number of resource units for each of the plurality of resource categories to the maximum resource unit limit for each of the plurality of resource categories, (b) performing a plurality of iterations of steps (d) to (h) of the first embodiment, wherein each of the plurality of iterations is performed with a distinct priority order that is selected from all possible priority orders of the plurality of contribution sub-components and the plurality of expense sub-components, until required resource units for that iteration exceed the minimum number of resource units, (c) updating the minimum number of resource units based on each completed iteration, (d) obtaining the minimum number of required resource units after all iterations corresponding to all possible priority orders have completed, and (e) obtaining the list of prioritized computerized work-items for the iteration that resulted in the minimum number of resource units.

In some embodiments, the non-transitory computer readable storage medium storing the sequence of instructions, which when executed by the processor, further causes tracking of progress of the plurality of computerized work-items by determining at least one of an overall contribution reached or an overall expense accumulated associated with the plurality of computerized work-items.

In some embodiments, the non-transitory computer readable storage medium storing the sequence of instructions, which when executed by the processor, further causes tracking of progress of the plurality of computerized work-items by (a) determining a deficit for each of the plurality of contribution sub-components by (i) determining an overall contribution reached by adding a first total of component numerical value of contribution sub-components of computerized work-items that are fully completed with a second total of a product of component numerical value of contribution sub-components of computerized work-items that are partially completed with their percentage of completion, and (ii) determining a delta between the contribution threshold and the overall contribution reached to obtain the deficit for each of the plurality of contribution sub-components, (b) determining a balance for each of the plurality of expense sub-components by (i) determining an overall expense accumulated by adding a first total of component numerical value of expense sub-components of computerized work-items that are fully completed with a second total of a product of component numerical value of expense sub-components of computerized work-items that are partially completed with their percentage of completion, and (ii) determining a delta between the expense threshold and the overall expense accumulated to obtain the balance for each of the plurality of expense sub-components, and (c) tracking of progress of the plurality of computerized work-items against the set of quantified computer-executable rules using the computed deficit and balance for each of the plurality of contribution and expense sub-components.

In some embodiments, the non-transitory computer readable storage medium storing the sequence of instructions, which when executed by the processor, further causes refining an estimate of a contribution sub-component in a bucket value or a numerical value of future planned computerized work-items using actual realized contributions obtained from at least one of (a) a usage telemetry, (b) a finer grained usage telemetry and (c) a quality telemetry.

In some embodiments, the non-transitory computer readable storage medium storing the sequence of instructions, which when executed by the processor, further causes refining an estimate of an expense sub-component in a bucket value or a numerical value of future planned computerized work-items based on actual expenses incurred in performing similar computerized work-items.

In some embodiments, the non-transitory computer readable storage medium storing the sequence of instructions, which when executed by the processor, further causes quantifying, a set of computer-executable rules that are specified using a percentage improvement over current base amounts, into a set of quantified computer-executable rules using the product of the percentage improvement and the current base amounts.

In some embodiments, the non-transitory computer readable storage medium storing the sequence of instructions, which when executed by the processor, causes the steps of (a) obtaining, using an input master list pane of a graphical user interface, the input master list of a plurality of computerized work-items, (b) processing a selection of computer-executable rules using a search icon and add icon based on inputs received at a rules initialization pane of the graphical user interface, and (c) displaying, at an output prioritized list pane of the user interface, the output prioritized list of computerized work-items for prioritizing work based on quantified computer-executable rules.

In a second embodiment, there is provided a software development device that causes processing of an input master list of a plurality of computerized work-items to generate an output prioritized list of the plurality of computerized work-items selected from the input master list, for prioritizing work based on a set of quantified computer-executable rules, the device includes a processor and a memory that stores a set of instructions, which when executed by the processor, performs the steps of processing of an input master list of a plurality of computerized work-items to generate an output prioritized list of the plurality of computerized work-items selected from the input master list, for prioritizing work based on a set of quantified computer-executable rules, said sequence of instructions include (a) obtaining a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item, (b) converting each of the plurality of contribution sub-components and expense sub-components that are estimated in buckets into a component numerical value using the bucket category to numerical value map, (c) determining a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with prioritized set of quantified computer-executable rules and a contribution sub-component or expense sub-component with either (i) non-prioritized set of quantified computer-executable rules or (ii) no associated set of quantified computer-executable rules is assigned a lower priority than the plurality of contribution sub-components or expense sub-components that are associated with prioritized set of quantified computer-executable rules, wherein the lower priority is derived from the default priority order, (d) generating a plurality of tuples comprising contribution sub-components and expense sub-components for each of the plurality of computerized work-items of the input master list, wherein the contribution sub-components and the expense sub-components in the tuple are arranged based on the priority order, (e) sorting the plurality of computerized work-items of the input master list in descending order of the plurality of tuples to obtain a sorted list of computerized work-items, (f) traversing the sorted list of computerized work-items to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold, (g) shuffling tuples for all unselected computerized work-items of the sorted list, by moving the sub-component that is at first position in the tuples to the end, upon determining that cumulative contribution of a contribution sub-component at first position in the tuples for the output prioritized list of computerized work-items exceeds the contribution threshold or the cumulative expense exceeds the expense threshold for an expense sub-component at first position in the tuples, and (h) repeating steps (e) to (g) until (i) the cumulative resource units required for each resource category to complete the output prioritized list of computerized work-items are greater than the maximum resource unit limit for each resource category, or (ii) the cumulative contributions for each of the contribution sub-components in the output prioritized list of computerized work-items are more than the contribution thresholds, or (iii) the cumulative expenses for each of the expense sub-components in the output prioritized list of computerized work-items have reached the expense threshold or (iv) computerized work-items in the sorted list available for selection have been exhausted.

In some embodiments, there is one uniform resource category with the plurality of computerized work-items having an estimate specified in number of resources.

In some embodiments, there is one uniform resource category with the plurality of computerized work-items having an estimate specified in time units.

In some embodiments, the software development device determines a minimum number of computerized work-items that satisfy the set of quantified computer-executable rules by (a) initializing the minimum number of required computerized work-items to total number of computerized work-items, (b) performing a plurality of iterations of steps (d) to (h) of the second embodiment, wherein each of the plurality of iterations is performed with a distinct priority order that is selected from all possible priority orders of the plurality of contribution sub-components and the plurality of expense sub-components, until a number of required computerized work-items for that iteration exceed the minimum number of required computerized work-items, (c) updating the minimum number of required computerized work-items based on each completed iteration, (d) obtaining the minimum number of required computerized work-items after all iterations corresponding to all possible priority orders have completed, and (e) obtaining the list of prioritized computerized work-items for the iteration that resulted in the minimum number of required computerized work-items.

In some embodiments, the software development device determines a set of computerized work-items requiring the minimum engineering resources that satisfy the set of quantified computer-executable rules by (a) initializing the minimum number of resource units for each of the plurality of resource categories to the maximum resource unit limit for each of the plurality of resource categories, (b) performing a plurality of iterations of steps (d) to (h) of the second embodiment, wherein each of the plurality of iterations is performed with a distinct priority order that is selected from all possible priority orders of the plurality of contribution sub-components and the plurality of expense sub-components, until required resource units for that iteration exceed the minimum number of resource units, (c) updating the minimum number of resource units based on each completed iteration, (d) obtaining the minimum number of required resource units after all iterations corresponding to all possible priority orders have completed, and (e) obtaining the list of prioritized computerized work-items for the iteration that resulted in the minimum number of resource units.

In some embodiments, the software development device tracks progress of the plurality of computerized work-items by determining at least one of an overall contribution reached or an overall expense accumulated associated with the plurality of computerized work-items.

In some embodiments, the software development device tracks progress of the plurality of computerized work-items by (a) determining a deficit for each of the plurality of contribution sub-components by (i) determining an overall contribution reached by adding a first total of component numerical value of contribution sub-components of computerized work-items that are fully completed with a second total of a product of component numerical value of contribution sub-components of computerized work-items that are partially completed with their percentage of completion, and (ii) determining a delta between the contribution threshold and the overall contribution reached to obtain the deficit for each of the plurality of contribution sub-components, (b) determining a balance for each of the plurality of expense sub-components by (i) determining an overall expense accumulated by adding a first total of component numerical value of expense sub-components of computerized work-items that are fully completed with a second total of a product of component numerical value of expense sub-components of computerized work-items that are partially completed with their percentage of completion, and (ii) determining a delta between the expense threshold and the overall expense accumulated to obtain the balance for each of the plurality of expense sub-components, and (c) tracking of progress of the plurality of computerized work-items against the set of quantified computer-executable rules using the computed deficit and balance for each of the plurality of contribution and expense sub-components.

In some embodiments, the software development device refines an estimate of a contribution sub-component in a bucket value or a numerical value of future planned computerized work-items using actual realized contributions obtained from at least one of (a) a usage telemetry, (b) a finer grained usage telemetry and (c) a quality telemetry.

In some embodiments, the software development device refines an estimate of an expense sub-component in a bucket value or a numerical value of future planned computerized work-items based on actual expenses incurred in performing similar computerized work-items.

In some embodiments, the software development device quantifies, a set of computer-executable rules that are specified using a percentage improvement over current base amounts, into a set of quantified computer-executable rules using the product of the percentage improvement and the current base amounts.

In some embodiments, software development device includes a graphical user interface that causes the steps of (a) obtaining, using an input master list pane of the graphical user interface, the input master list of a plurality of computerized work-items, (b) processing a selection of computer-executable rules using a search icon and add icon based on inputs received at a rules initialization pane of the graphical user interface, and (c) displaying, at an output prioritized list pane of the user interface, the output prioritized list of computerized work-items for prioritizing work based on quantified computer-executable rules.

In a third embodiment, an embodiment herein provides a method of processing of an input master list of a plurality of computerized work-items to generate an output prioritized list of the plurality of computerized work-items selected from the input master list, for prioritizing work based on a set of quantified computer-executable rules. The method includes (a) obtaining a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item, (b) converting each of the plurality of contribution sub-components and expense sub-components that are estimated in buckets into a component numerical value using the bucket category to numerical value map, (c) determining a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with prioritized set of quantified computer-executable rules and a contribution sub-component or expense sub-component with either (i) non-prioritized set of quantified computer-executable rules or (ii) no associated set of quantified computer-executable rules is assigned a lower priority than the plurality of contribution sub-components or expense sub-components that are associated with prioritized set of quantified computer-executable rules, wherein the lower priority is derived from the default priority order, (d) generating a plurality of tuples comprising contribution sub-components and expense sub-components for each of the plurality of computerized work-items of the input master list, wherein the contribution sub-components and the expense sub-components in the tuple are arranged based on the priority order, (e) sorting the plurality of computerized work-items of the input master list in descending order of the plurality of tuples to obtain a sorted list of computerized work-items, (f) traversing the sorted list of computerized work-items to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold, (g) shuffling tuples for all unselected computerized work-items of the sorted list, by moving the sub-component that is at first position in the tuples to the end, upon determining that cumulative contribution of a contribution sub-component at first position in the tuples for the output prioritized list of computerized work-items exceeds the contribution threshold or the cumulative expense exceeds the expense threshold for an expense sub-component at first position in the tuples, and (h) repeating steps (e) to (g) until (i) the cumulative resource units required for each resource category to complete the output prioritized list of computerized work-items are greater than the maximum resource unit limit for each resource category, or (ii) the cumulative contributions for each of the contribution sub-components in the output prioritized list of computerized work-items are more than the contribution thresholds, or (iii) the cumulative expenses for each of the expense sub-components in the output prioritized list of computerized work-items have reached the expense threshold or (iv) computerized work-items in the sorted list available for selection have been exhausted.

In some embodiments, there is one uniform resource category with the plurality of computerized work-items having an estimate specified in number of resources.

In some embodiments, there is one uniform resource category with the plurality of computerized work-items having an estimate specified in time units.

In some embodiments, the method further comprises determining a minimum number of computerized work-items that satisfy the set of quantified computer-executable rules by (a) initializing the minimum number of required computerized work-items to total number of computerized work-items, (b) performing a plurality of iterations of steps (d) to (h) of the third embodiment, wherein each of the plurality of iterations is performed with a distinct priority order that is selected from all possible priority orders of the plurality of contribution sub-components and the plurality of expense sub-components, until a number of required computerized work-items for that iteration exceed the minimum number of required computerized work-items, (c) updating the minimum number of required computerized work-items based on each completed iteration, (d) obtaining the minimum number of required computerized work-items after all iterations corresponding to all possible priority orders have completed, and (e) obtaining the list of prioritized computerized work-items for the iteration that resulted in the minimum number of required computerized work-items.

In some embodiments, the method further comprises determining a set of computerized work-items requiring the minimum engineering resources that satisfy the set of quantified computer-executable rules by (a) initializing the minimum number of resource units for each of the plurality of resource categories to the maximum resource unit limit for each of the plurality of resource categories, (b) performing a plurality of iterations of steps (d) to (h) of the third embodiment, wherein each of the plurality of iterations is performed with a distinct priority order that is selected from all possible priority orders of the plurality of contribution sub-components and the plurality of expense sub-components, until required resource units for that iteration exceed the minimum number of resource units, (c) updating the minimum number of resource units based on each completed iteration, (d) obtaining the minimum number of required resource units after all iterations corresponding to all possible priority orders have completed, and (e) obtaining the list of prioritized computerized work-items for the iteration that resulted in the minimum number of resource units.

In some embodiments, the method further comprises tracking of progress of the plurality of computerized work-items by determining at least one of an overall contribution reached or an overall expense accumulated associated with the plurality of computerized work-items.

In some embodiments, the method further comprises tracking of progress of the plurality of computerized work-items by (a) determining a deficit for each of the plurality of contribution sub-components by (i) determining an overall contribution reached by adding a first total of component numerical value of contribution sub-components of computerized work-items that are fully completed with a second total of a product of component numerical value of contribution sub-components of computerized work-items that are partially completed with their percentage of completion, and (ii) determining a delta between the contribution threshold and the overall contribution reached to obtain the deficit for each of the plurality of contribution sub-components, (b) determining a balance for each of the plurality of expense sub-components by (i) determining an overall expense accumulated by adding a first total of component numerical value of expense sub-components of computerized work-items that are fully completed with a second total of a product of component numerical value of expense sub-components of computerized work-items that are partially completed with their percentage of completion, and (ii) determining a delta between the expense threshold and the overall expense accumulated to obtain the balance for each of the plurality of expense sub-components, and (c) tracking of progress of the plurality of computerized work-items against the set of quantified computer-executable rules using the computed deficit and balance for each of the plurality of contribution and expense sub-components.

In some embodiments, the method further comprises refining an estimate of a contribution sub-component in a bucket value or a numerical value of future planned computerized work-items using actual realized contributions obtained from at least one of (a) a usage telemetry, (b) a finer grained usage telemetry and (c) a quality telemetry.

In some embodiments, the method further comprises refining an estimate of an expense sub-component in a bucket value or a numerical value of future planned computerized work-items based on actual expenses incurred in performing similar computerized work-items.

In some embodiments, the method further comprises quantifying, a set of computer-executable rules that are specified using a percentage improvement over current base amounts, into a set of quantified computer-executable rules using the product of the percentage improvement and the current base amounts.

In some embodiments, the method further comprises the steps of (a) obtaining, using an input master list pane of a graphical user interface, the input master list of a plurality of computerized work-items, (b) processing a selection of computer-executable rules using a search icon and add icon based on inputs received at a rules initialization pane of the graphical user interface, and (c) displaying, at an output prioritized list pane of the user interface, the output prioritized list of computerized work-items for prioritizing work based on quantified computer-executable rules.

The method provides a framework to link contributions and expenses associated with quantified computer-executable rules with the plurality of computerized work-items and also provides an approach to measure progress of the plurality of computerized work-items against desired computer-executable rules.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 4A-D are flow diagrams of a method for generation of an output prioritized list of computerized work-items for prioritizing work based on a set of quantified computer-executable rules, according to some embodiments herein;

FIG. 5A-C is an interaction diagram of a method for generation of an output prioritized list of computerized work-items for prioritizing work based on a set of quantified computer-executable rules, according to some embodiments herein;

DETAILED DESCRIPTION

Figure 1:
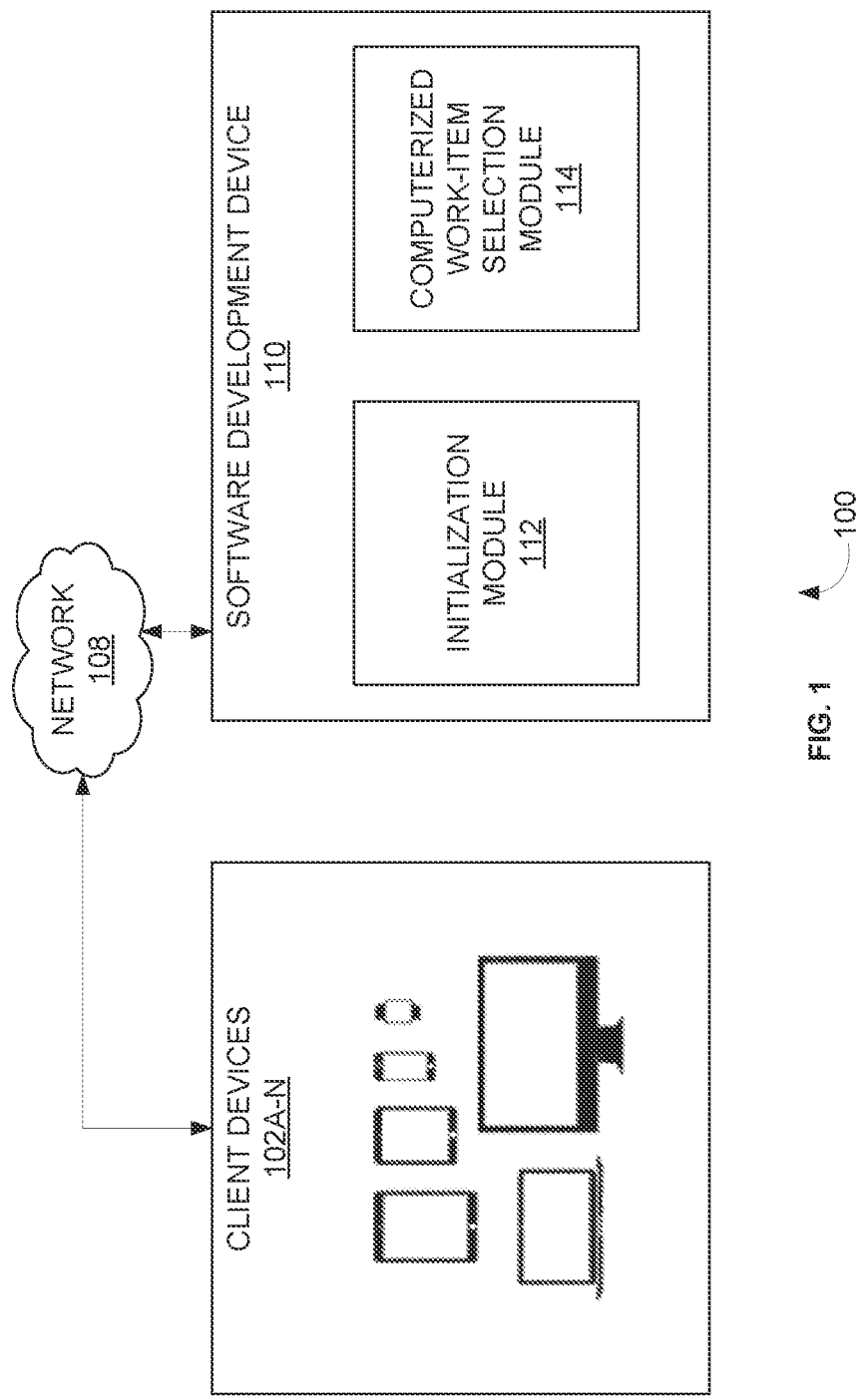
FIG. 1 illustrates a system for generation of an output prioritized list of computerized work-items for prioritizing work based on a set of quantified computer-executable rules, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generation of a prioritized list of computerized work-items for prioritizing work based on a set of quantified computer-executable rules. Referring now to the drawings, and more particularly to FIGS. 1 to 7, where similar reference characters denote corresponding features consistently throughout the figures, preferred embodiments are shown.

As used herein the term "work-item" is defined as a computerized documented task, activity, or action that needs to take place in an organization that is executed by one or more resource units belonging to different resource categories, and the estimates of required resource units for each resource category are associated with the work-item during planning that happens before execution.

FIG. 1 illustrates a system 100 system for generation of an output prioritized list of computerized work-items for prioritizing work based on a set of quantified computer-executable rules, according to some embodiments herein. The system 100 includes one or more client devices 102A-N (where N is a positive integer) that comprise the plurality of distinct software development applications.

The system 100 provides a framework to link contributions and expenses associated with quantified computer-executable rules with the plurality of computerized work-items.

Examples of the plurality of contribution sub-components are described in Table 1 for software development work.

TABLE 1

Contribution sub-components

| No. | Contribution sub-component | Contribution specified as |
|---|---|---|
| 1. | Expected revenue impact | Bucket category or numerical value |
| 2. | Expected adoption (by few, most, or all users) | Bucket category |
| 3. | Expected impact on overall product adoption | Bucket category |
| 4. | Expected improvement in product quality | Bucket category |
| 5. | Expected impact on customer satisfaction | Bucket category |

TABLE 1-continued

Contribution sub-components

| No. | Contribution sub-component | Contribution specified as |
|---|---|---|
| 6. | Expected engineering efficiency savings | Bucket category or numerical value |
| 7. | Expected improvements to employee productivity | Bucket category |
| 8. | Expected impact on employee engagement | Bucket category |
| 9. | Value for Marketing (includes Time to Market considerations) | Bucket category or numerical value |
| 10. | Value for Sales (includes consideration for new sales, renewals, or expansions) | Bucket category or numerical value |
| 11. | Value as Intellectual Property (for differentiation or avoiding infringement) | Bucket category or numerical value |
| 12. | User defined contribution fields | Bucket category or numerical value |

Examples of the plurality of expense sub-components are described in Table 2 for software development work

TABLE 2

Expense sub-components

| No. | Expense sub-component | Expense specified as |
|---|---|---|
| 1. | Engineering Resources (can use "Time + Resource Category -> numerical value" conversion map) | Bucket category or numerical value |
| 2. | Hardware/Software (to cover required hardware/software for hosting or development) | Bucket category or numerical value |
| 3. | Legal (ex. to cover non-fulfillment expenses related to contract or SLA breach) | Bucket category or numerical value |
| 4. | Other (ex. to cover negative impact to other areas due to reallocation of resources or hiring related expenses of needed resources) | Bucket category or numerical value |
| 5. | User defined expense fields | Bucket category or numerical value |

Bucket categories like "low, medium, high" or "XS, S, M, L, XL" may be used for expected contributions and expenses instead of specific numerical value.

In some embodiments, teams like Marketing, Sales or Legal that are not directly involved in software development may have their own list of contribution and expense sub-components for their computerized work-items.

"Computer-executable rules" may be specified as stand-alone or specified through more elaborate mechanisms, for example, by using an Objective and Key Results (OKR) framework which comprises computer-executable rules and multiple key results for each computer-executable rule that may be updated on a periodic basis. Regardless of the way the computer-executable rules are specified, most desired outcomes for an organization may be mapped to the same contribution and expense sub-components as described in Table 3 for software development work.

TABLE 3

Computer-executable rules

| Computer-executable rules | Relevant contribution or expense sub-component |
|---|---|
| Increasing Revenue | Expected revenue impact contribution sub-component |
| Increasing Product adoption/Market share | Expected adoption, Expected impact on overall product adoption contribution sub-component |
| Increasing Product quality | Expected improvement in product quality contribution sub-component |
| Increasing Customer satisfaction | Expected impact on customer satisfaction contribution sub-component |
| Increasing Employee productivity | Expected improvements to employee productivity contribution sub-component |
| Increasing Employee engagement | Expected impact on employee engagement contribution sub-component |
| Increasing Marketing generated leads | Value for Marketing contribution sub-component |
| Increasing Customers (including renewals/expansion) | Value for Sales contribution sub-component |
| Increasing Intellectual Property | Value as Intellectual Property |
| Reducing Engineering expense | Engineering expense sub-component - Expected engineering efficiency savings contribution sub-component |
| Reducing Hardware/Software expense | Hardware/Software expense sub-component |
| Reducing Legal expense | Legal expense sub-component |
| Reducing Overall expense | Engineering + Hardware/Software + Legal + Other expense sub-component |

The one or more client devices 102A-N are connected via a network 108 to a software development device 110 that comprises an initialization module 112 and a computerized work-item selection module 114. The software development device 110, which may be a computer, may be configured to obtain a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item. The software development device 110 may convert each of the plurality of contribution sub-components and expense sub-components that are estimated in buckets into a component numerical value using the bucket category to numerical value map. The software development device 110 may determine a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with prioritized set of quantified computer-executable rules and a contribution sub-component or expense sub-component with either (i)

non-prioritized set of quantified computer-executable rules or (ii) no associated set of quantified computer-executable rules is assigned a lower priority than the plurality of contribution sub-components or expense sub-components that are associated with prioritized set of quantified computer-executable rules, wherein the lower priority is derived from the default priority order. The software development device 110 may generate a plurality of tuples comprising contribution sub-components and expense sub-components for each of the plurality of computerized work-items of the input master list, wherein the contribution sub-components and the expense sub-components in the tuple are arranged based on the priority order. The software development device 110 may sort the plurality of computerized work-items of the input master list in descending order of the plurality of tuples to obtain a sorted list of computerized work-items. The software development device 110 may traverse the sorted list of computerized work-items to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold. The software development device 110 shuffles tuples for all unselected computerized work-items of the sorted list, by moving the sub-component that is at first position in the tuples to the end, upon determining that cumulative contribution of a contribution sub-component at first position in the tuples for the output prioritized list of computerized work-items exceeds the contribution threshold or the cumulative expense exceeds the expense threshold for an expense sub-component at first position in the tuples. The software development device 110 may repeat sorting the plurality of computerized work-items, traversing the sorted list of computerized work-items and shuffling tuples for all unselected computerized work-items until (i) the cumulative resource units required for each resource category to complete the output prioritized list of computerized work-items are greater than the maximum resource unit limit for each resource category, or (ii) the cumulative contributions for each of the contribution sub-components in the output prioritized list of computerized work-items are more than the contribution thresholds, or (iii) the cumulative expenses for each of the expense sub-components in the output prioritized list of computerized work-items have reached the expense threshold or (iv) computerized work-items in the sorted list available for selection have been exhausted.

The system 100 also provides an approach to measure progress of the plurality of computerized work-items against desired computer-executable rules of an organization.

Figure 2:
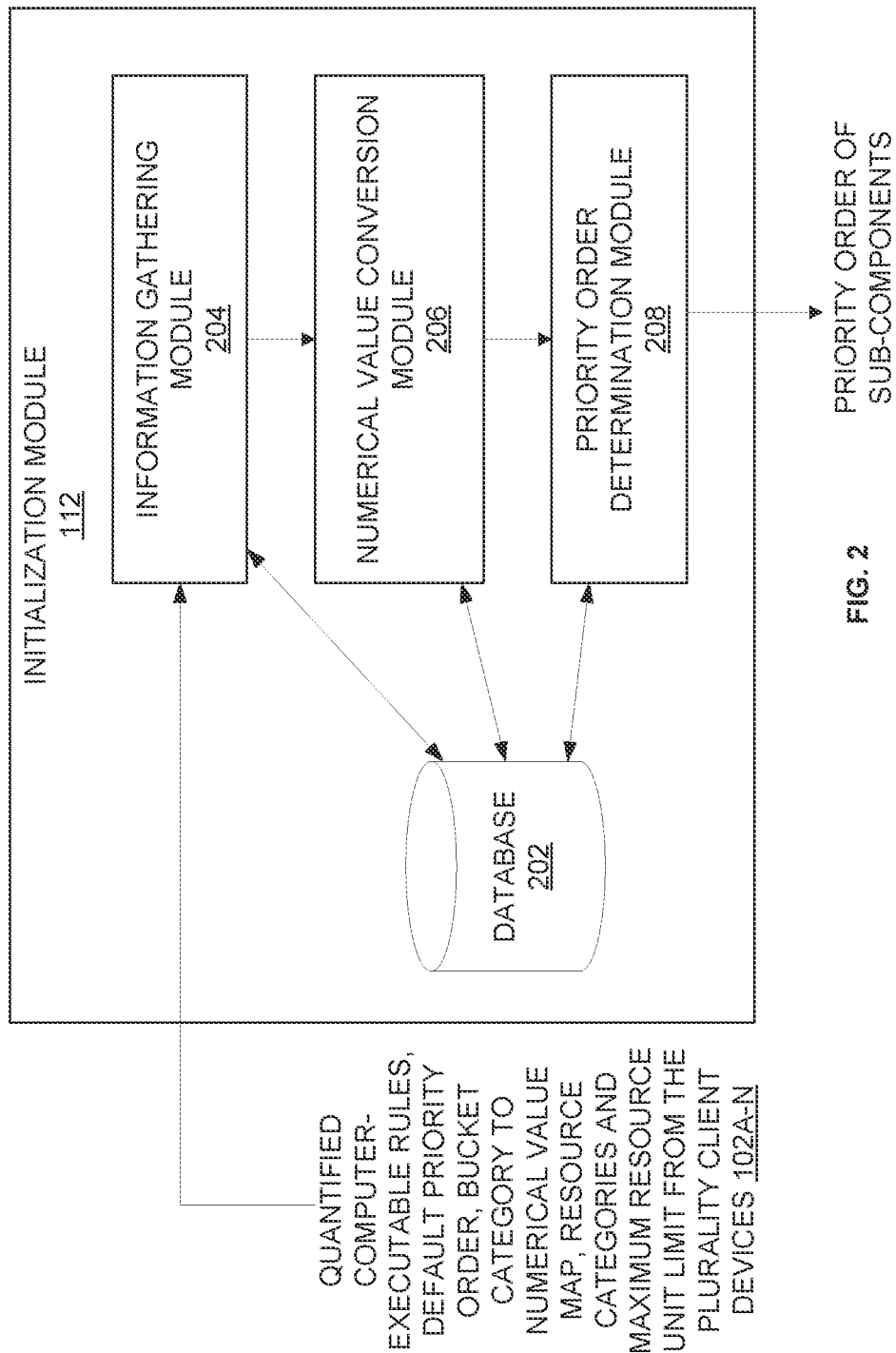
FIG. 2 illustrates an exploded view of an initialization module of FIG. 1, according to some embodiments herein.

FIG. 2 illustrates an exploded view of the initialization module 112 of FIG. 1, according to some embodiments herein. The initialization module 112 comprises a database 202, an information gathering module 204, a numerical value conversion module 206 and a priority order determination module 208. The information gathering module 204 obtains, from the one or more client devices 102A-N, a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item stored in the database 202.

In some embodiments, each computerized work-item is tagged with (a) kind of resources that are required to complete that computerized work-item as captured by the resource category and (b) an estimate of resource units required for each resource category. The resource categories for software development teams may include, but are not limited to, a user interface developer, a back-end developer, a data scientist, a program manager, a quality assurance engineer. The total resource units for each of the plurality of resource categories is initialized to zero.

The numerical value conversion module 206 converts each of the plurality of contribution sub-components and expense sub-components that are estimated in buckets into a component numerical value using the bucket category to numerical value map. The priority order determination module 208 determines a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with prioritized set of quantified computer-executable rules and a contribution sub-component or expense sub-component with either (i) non-prioritized set of quantified computer-executable rules or (ii) no associated set of quantified computer-executable rules is assigned a lower priority than the plurality of contribution sub-components or expense sub-components that are associated with prioritized set of quantified computer-executable rules, wherein the lower priority is derived from the default priority order.

Figure 3:
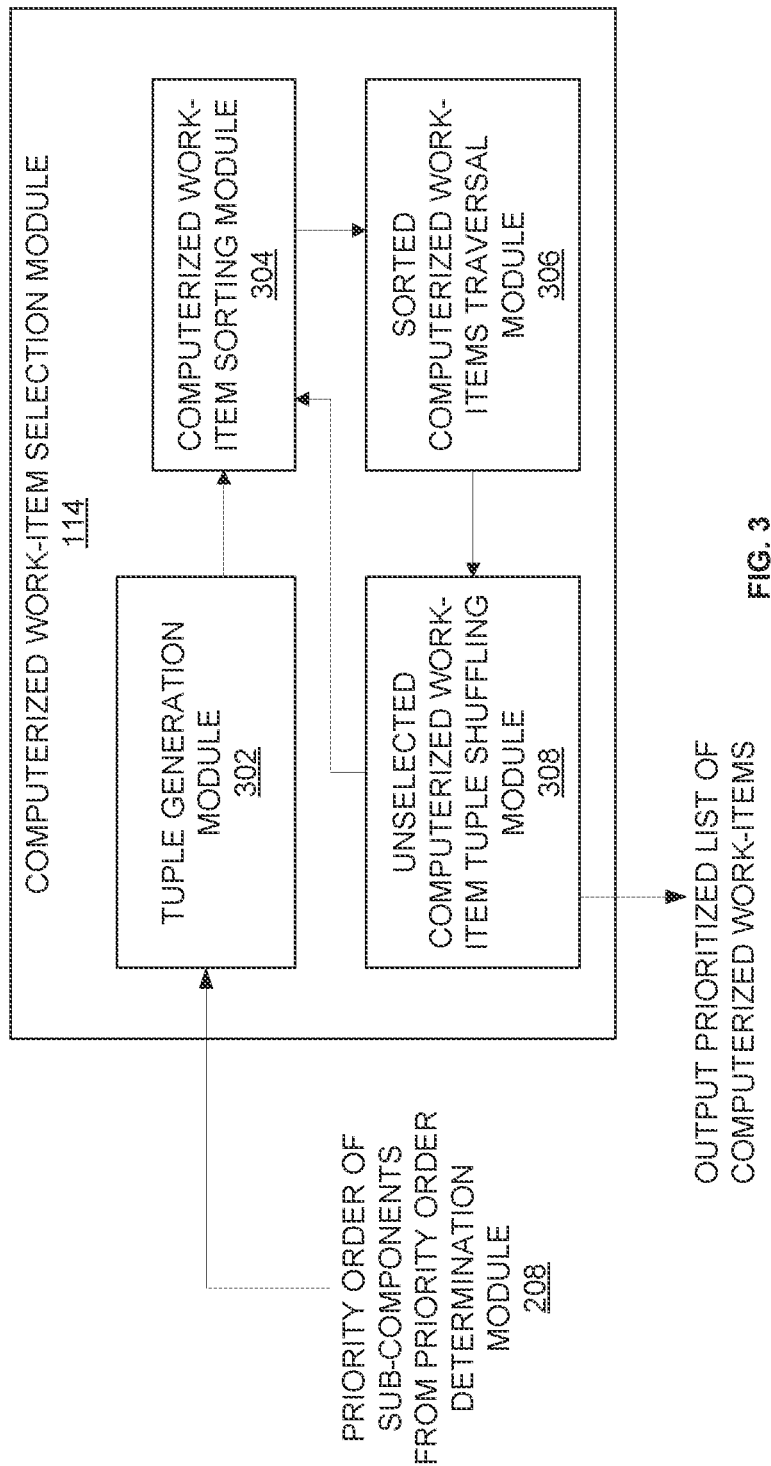
FIG. 3 illustrates an exploded view of a computerized work-item selection module of FIG. 1, according to some embodiments herein.

FIG. 3 is an exploded view of the computerized work-item selection module 114 of FIG. 1 according to some embodiments herein. The computerized work-item selection module 114 comprises a tuple generation module 302, a computerized work-item sorting module 304, a sorted computerized work-items traversal module 306 and an unselected computerized work-item shuffling module 308. The tuple generation module 302 generates a plurality of tuples comprising contribution sub-components and expense sub-components for each of the plurality of computerized work-items of the input master list, wherein the contribution sub-components and the expense sub-components in the tuple are arranged based on the priority order. The computerized work-item sorting module 304 sorts the plurality of computerized work-items of the input master list in descending order of the plurality of tuples to obtain a sorted list of computerized work-items. The sorted computerized work-items traversal module 306 traverses the sorted list of computerized work-items to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold. The unselected computerized work-item shuffling module 308 shuffles tuples for all unselected computerized work-items of the sorted list, by moving the sub-component that is at first position in the tuples to the end, upon determining that cumulative contribution of a contribution sub-component at first position in the tuples for the output prioritized list of computerized work-items exceeds the contribution threshold or the cumulative expense exceeds the expense threshold for an expense sub-component at first position in the tuples. Sorting the plurality of computerized work-items by the computerized work-item sorting module 304, traversing the sorted list of computerized work-items by the sorted computerized work-items traversal module 306 and shuffling tuples for all unselected computerized work-items by the unselected computerized work-item tuple shuffling module 308 may be repeated until (i) the cumulative resource units required for each resource category to complete the output prioritized list of computerized work-items are greater than the maximum resource unit limit for each resource category, or (ii) the cumulative contributions for each of the contribution sub-components in the output prioritized list of computerized work-items are more than the contribution thresholds, or (iii) the cumulative expenses for each of the expense sub-components in the output prioritized list of computerized work-items have reached the expense threshold or (iv) computerized work-items in the sorted list available for selection have been exhausted.

In some embodiments, there is one uniform resource category with the plurality of computerized work-items having an estimate specified in number of resources. A maximum number of available resources is obtained from the one or more client device 102A-N and cumulative resources required to complete the output prioritized list of computerized work-items are initialized to 0. Each computerized work-item may have a tagged value that depicts a number of resources required to complete that computerized work-item. In such an embodiment, the sorted computerized work-items traversal module 306 may uses a simplified traversal of the sorted list of computerized work-items to generate the output prioritized list of computerized work-items for prioritizing work based on the set of quantified computer-executable rules, wherein computerized work-items are selected during traversal while ensuring (i) cumulative resource units required to complete the output prioritized list of computerized work-items are less than the maximum available resource units and (ii) cumulative expenses for expense sub-components in the output prioritized list of computerized work-items are less than the expense threshold.

In some embodiments, there is one uniform resource category with the plurality of computerized work-items having an estimate in time units. A maximum number of available time units is obtained from the one or more client device 102A-N and each computerized work-item may have a tagged time value that depicts an amount of time required to complete that computerized work-item. Initially, cumulative time units required to complete the output prioritized list of computerized work-items are initializecd to 0. In such an embodiment, the sorted computerized work-items traversal module 306 may use a simplified traversal of the sorted list of computerized work-items to generate the output prioritized list of computerized work-items for prioritizing work based on the set of quantified computer-executable rules, wherein computerized work-items are selected during traversal while ensuring (i) cumulative time units required to complete the output prioritized list of computerized work-items are less than the maximum available time units and (ii) cumulative expenses for expense sub-components in the output prioritized list of computerized work-items are less than the expense threshold.

In some embodiments, progress of the plurality of computerized work-items is tracked by determining at least one of an overall contribution reached or an overall expense accumulated associated with the plurality of computerized work-items.

In some embodiments, where the contribution or expense sub-components are numerical, both the "overall contribution reached" and "overall expense accumulated" may be determined using simple sum computations.

In some embodiments, where the contribution or expense sub-components are not numerical but are in bucket values that are comparable across the contribution or expense sub-components, the "overall contribution reached" and the "overall expense accumulated" may be determined in terms of the comparable bucket values. Optionally, if the bucket values are not comparable, the bucket equivalence map may be used to relate bucket values of different contribution/expense sub-components to each other. As an example, for a "low, medium, high" bucket, the map may establish equivalence between 'low' for a sub-component like "expected adoption" and 'low' for another sub-component like "expected impact on customer satisfaction". Then the "overall contribution reached" and "overall expense accumulated" may be determined in terms of standardized bucket values.

In some embodiments, progress of the plurality of computerized work-items is tracked by (a) determining a deficit for each of the plurality of contribution sub-components by: (i) determining an overall contribution reached by adding a first total of component numerical value of contribution sub-components of computerized work-items that are fully completed with a second total of a product of component numerical value of contribution sub-components of computerized work-items that are partially completed with their percentage of completion and (ii) determining a delta between the contribution threshold and the overall contribution reached to obtain the deficit for each of the plurality of contribution sub-components, (b) determining a balance for each of the plurality of expense sub-components by: (i) determining an overall expense accumulated by adding a first total of component numerical value of expense sub-components of computerized work-items that are fully completed with a second total of a product of component numerical value of expense sub-components of computerized work-items that are partially completed with their percentage of completion and (ii) determining a delta between the expense threshold and the overall expense accumulated to obtain the balance for each of the plurality of expense sub-components, and (c) tracking of progress of the plurality of computerized work-items against the set of quantified computer-executable rules using the computed deficit and balance for each of the plurality of contribution and expense sub-components.

In some embodiments, an estimate of a contribution sub-component in a bucket value or a numerical value of future planned computerized work-items is refined using actual realized contributions obtained from at least one of (a) a usage telemetry, (b) a finer grained usage telemetry, and (c) a quality telemetry. An estimate of a contribution sub-component in a bucket value or a numerical value of future planned computerized work-items may be refined based on actual expenses incurred in performing similar computerized work-items. The numerical amounts or buckets associated with contribution sub-components of computerized work-items are expectations or projections created for planning purposes. For certain computerized work-item contribution sub-components like feature/product adoption or product quality, telemetry may provide an actual value. Usage telemetry may enable quantifying feature adoption and impact on overall product adoption. Finer grained usage telemetry may provide insights into usage frequency and variation of usage over time by different groups. The finer grained usage telemetry may also enable identifying whether a feature was tried but subsequently dropped from being used actively. The quality telemetry (capturing crashes, logged errors, customer reported bugs) may enable quantifying improvement in product quality. To measure actual realized contribution, information on outcomes desired by an organization may be gathered from software tools that are used by the organization for tracking those different outcomes. As examples, software tools may include, but are not limited to, Salesforce® software for sales, NetSuite® software for expense and revenue, Marketo® software for marketing related information, Zendesk® software to augment quality telemetry, and Pendo® software for customer satisfaction information. The measured realized values from each telemetry or tools may guide setting of bucket or numerical values of contribution sub-components of future similar computerized work-items in a similar manner as actual expense incurred in performing the computerized work-items guides setting of bucket or numerical values for expense sub-components of future similar computerized work-items.

Figure 4C:
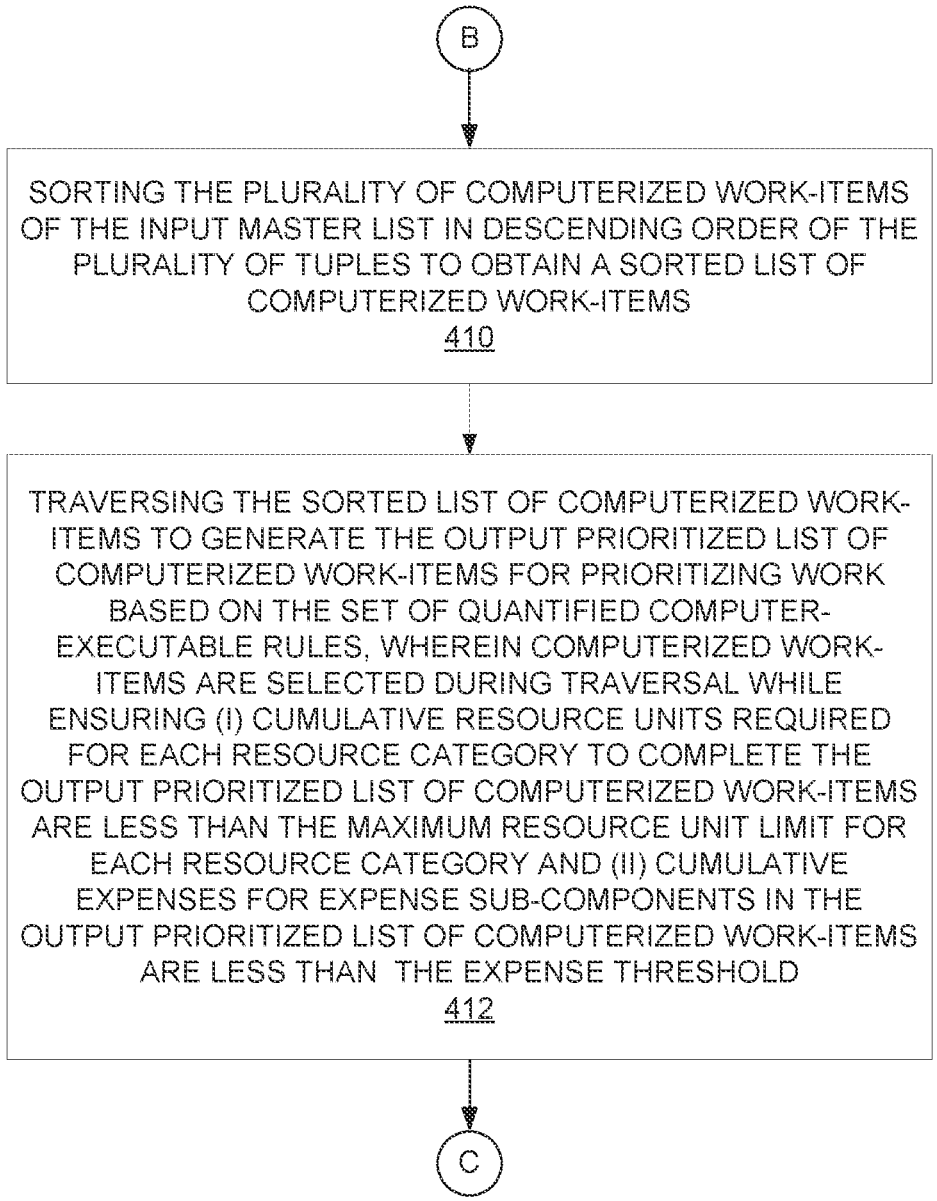

FIGS. 4A and 4B are flow diagrams of a method for generation of an output prioritized list of computerized work-items for prioritizing work based on a set of quantified computer-executable rules, according to some embodiments herein. At step 402, the method comprises obtaining a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item. At step 404, the method comprises converting each of the plurality of contribution sub-components and expense sub-components that are estimated in buckets into a component numerical value using the bucket category to numerical value map. At step 406, the method comprises determining a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with prioritized set of quantified computer-executable rules and a contribution sub-component or expense sub-component with either (i) non-prioritized set of quantified computer-executable rules or (ii) no associated set of quantified computer-executable rules is assigned a lower priority than the plurality of contribution sub-components or expense sub-components that are associated with prioritized set of quantified computer-executable rules, wherein the lower priority is derived from the default priority order. At step 408, the method comprises generating a plurality of tuples comprising contribution sub-components and expense sub-components for each of the plurality of computerized work-items of the input master list, wherein the contribution sub-components and the expense sub-components in the tuple are arranged based on the priority order. At step 410, the method comprises sorting the plurality of computerized work-items of the input master list in descending order of the plurality of tuples to obtain a sorted list of computerized work-items. At step 412, the method comprises traversing the sorted list of computerized work-items to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold. At step 414, the method comprises shuffling tuples for all unselected computerized work-items of the sorted list, by moving the sub-component that is at first position in the tuples to the end, upon determining that cumulative contribution of a contribution sub-component at first position in the tuples for the output prioritized list of computerized work-items exceeds the contribution threshold or the cumulative expense exceeds the expense threshold for an expense sub-component at first position in the tuples. At step 416, the method comprises repeating steps 410 to 414 until (i) the cumulative resource units required for each resource category to complete the output prioritized list of computerized work-items are greater than the maximum resource unit limit for each resource category, or (ii) the cumulative contributions for each of the contribution sub-components in the output prioritized list of computerized work-items are more than the contribution thresholds, or (iii) the cumulative expenses for each of the expense sub-components in the output prioritized list of computerized work-items have reached the expense threshold or (iv) computerized work-items in the sorted list available for selection have been exhausted.

In some embodiments, a minimum number of computerized work-items that satisfy the set of quantified computer-executable rules is determined by (a) initializing the minimum number of required computerized work-items to total number of computerized work-items, (b) performing a plurality of iterations of steps 408 to 416 of the method for generation of an output prioritized list of computerized work-items for prioritizing work based on a set of quantified computer-executable rules, wherein each of the plurality of iterations is performed with a distinct priority order that is selected from all possible priority orders of the plurality of contribution sub-components and the plurality of expense sub-components, until a number of required computerized work-items for that iteration exceed the minimum number of required computerized work-items, (c) updating the minimum number of required computerized work-items based on each completed iteration, (d) obtaining the minimum number of required computerized work-items after all iterations corresponding to all possible priority orders have completed and (e) obtaining the list of prioritized computerized work-items for the iteration that resulted in the minimum number of required computerized work-items.

In some embodiments, a set of computerized work-items requiring the minimum engineering resources that satisfy the set of quantified computer-executable rules is determined by (a) initializing the minimum number of resource units for each of the plurality of resource categories to the maximum resource unit limit for each of the plurality of resource categories, (b) performing a plurality of iterations of steps 408 to 416 of the method for generation of an output prioritized list of computerized work-items for prioritizing work based on a set of quantified computer-executable rules, wherein each of the plurality of iterations is performed with a distinct priority order that is selected from all possible priority orders of the plurality of contribution sub-components and the plurality of expense sub-components, until required resource units for that iteration exceed the minimum number of resource units, (c) updating the minimum number of resource units based on each completed iteration, (d) obtaining the minimum number of required resource units after all iterations corresponding to all possible priority orders have completed and (e) obtaining the list of prioritized computerized work-items for the iteration that resulted in the minimum number of resource units.

Figure 5C:
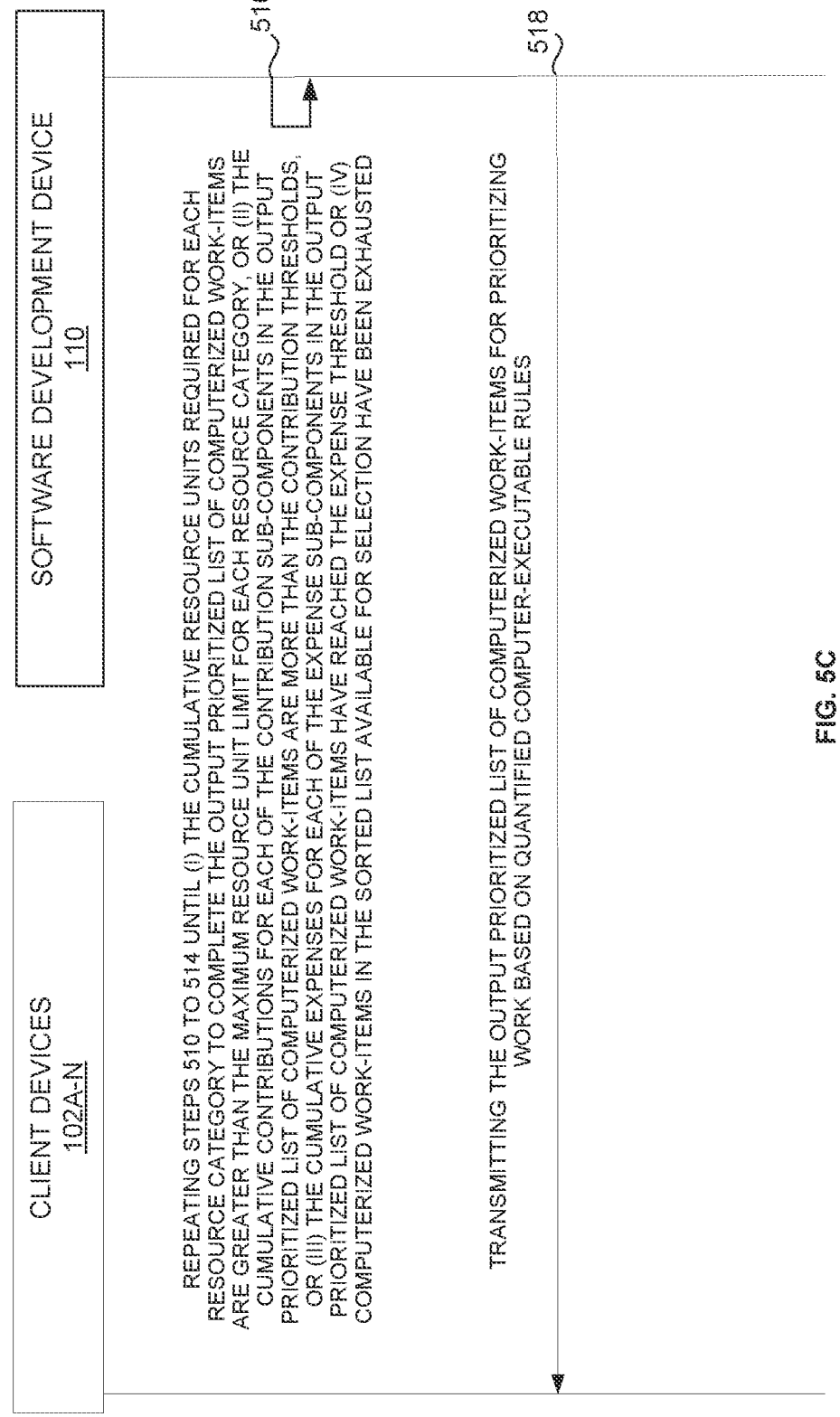

FIGS. 5A and 5B are an interaction diagram of a method for generation of an output prioritized list of computerized work-items for prioritizing work based on a set of quantified computer-executable rules, according to some embodiments herein. At step 502 a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules are obtained, where each contribution sub-component associated with a computerized work-item has a contribution amount that counts towards a contribution threshold upon completion of the computerized work-item and each expense sub-component has an expense amount that counts towards an expense threshold upon completion of the computerized work-item. At step 504, each of the plurality of contribution sub-components and expense sub-components that are estimated in buckets are converted into a component numerical value using the bucket category to numerical value map. At step 506, a priority order of each of the plurality of contribution sub-components and the plurality of expense sub-components is determined based on the set of quantified computer-executable rules corresponding to the plurality of contribution sub-components and expense sub-components, where a contribution sub-component or expense sub-component at the top in the priority order corresponds to a set of quantified computer-executable rules having a highest priority among the plurality of contribution sub-components or expense sub-components that are associated with prioritized set of quantified computer-executable rules and a contribution sub-component or expense sub-component with either (i) non-prioritized set of quantified computer-executable rules or (ii) no associated set of quantified computer-executable rules is assigned a lower priority than the plurality of contribution sub-components or expense sub-components that are associated with prioritized set of quantified computer-executable rules, wherein the lower priority is derived from the default priority order. At step 508, a plurality of tuples comprising contribution sub-components and expense sub-components are generated for each of the plurality of computerized work-items of the input master list, wherein the contribution sub-components and the expense sub-components in the tuple are arranged based on the priority order. At step 510, the plurality of computerized work-items of the input master list are sorted in descending order of the plurality of tuples to obtain a sorted list of computerized work-items. At step 512, the sorted list of computerized work-items are traversed to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold. At step 514, tuples for all unselected computerized work-items of the sorted list are shuffled, by moving the sub-component that is at first position in the tuples to the end, upon determining that cumulative contribution of a contribution sub-component at first position in the tuples for the output prioritized list of computerized work-items exceeds the contribution threshold or the cumulative expense exceeds the expense threshold for an expense sub-component at first position in the tuples. At step 516, steps 510 to 514 are repeated until (i) the cumulative resource units required for each resource category to complete the output prioritized list of computerized work-items are greater than the maximum resource unit limit for each resource category, or (ii) the cumulative contributions for each of the contribution sub-components in the output prioritized list of computerized work-items are more than the contribution thresholds, or (iii) the cumulative expenses for each of the expense sub-components in the output prioritized list of computerized work-items have reached the expense threshold or (iv) computerized work-items in the sorted list available for selection have been exhausted. At step 518, the output prioritized list of computerized work-items for prioritizing work based on quantified computer-executable rules is transmitted to the software development device 110.

The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (1/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
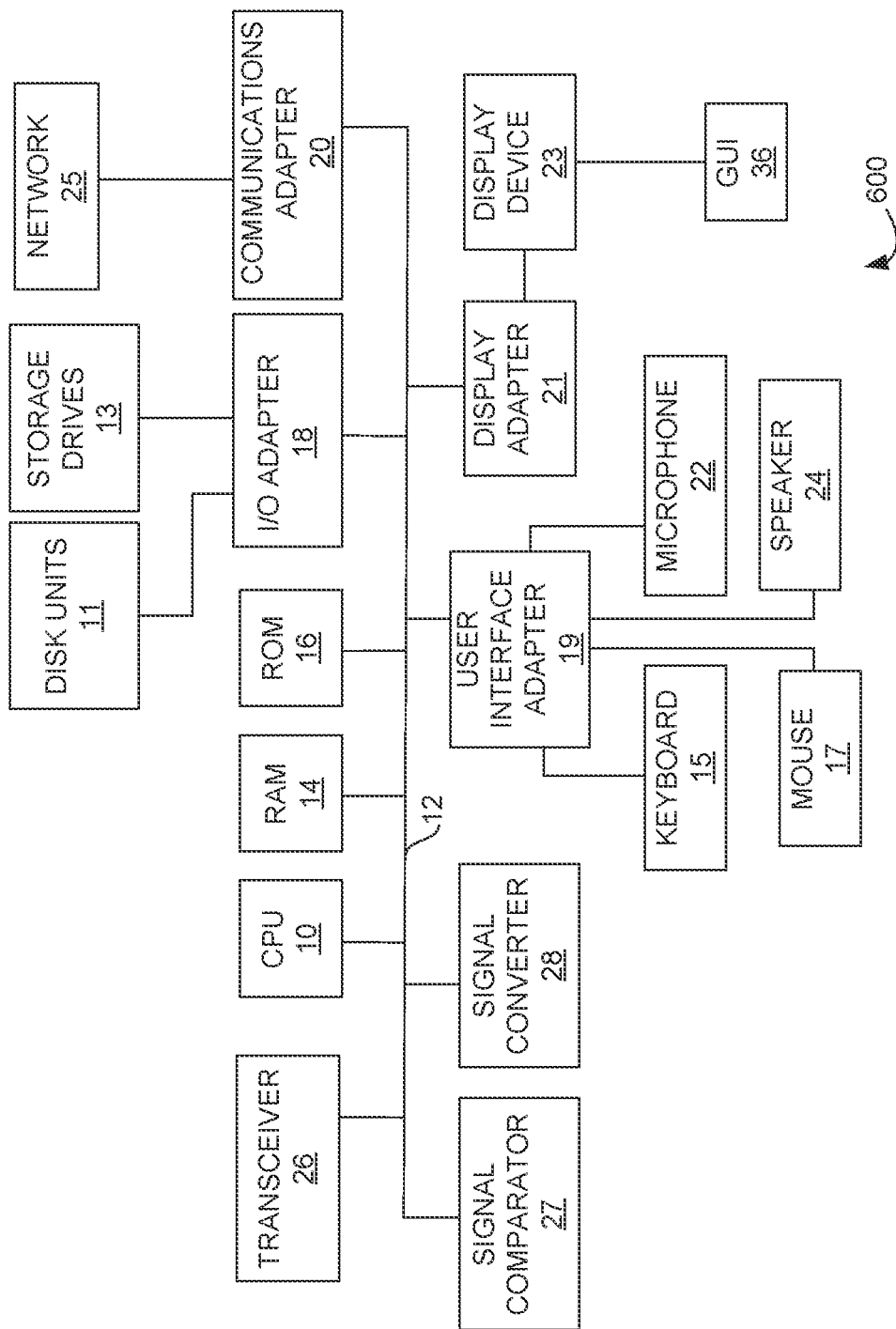
FIG. 6 is a schematic diagram of a computer architecture, in accordance with the embodiments herein.

A representative hardware environment for practicing the embodiments herein is depicted in FIG. 6, with reference to FIGS. 1 through 5B. This schematic drawing illustrates a hardware configuration of a software development device/computer system 600 in accordance with the embodiments herein. The system 600 comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 600 can read the inventive instructions on the program storage devices and follow these instructions to execute the methodology of the embodiments herein. The system 900 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

Figure 7:
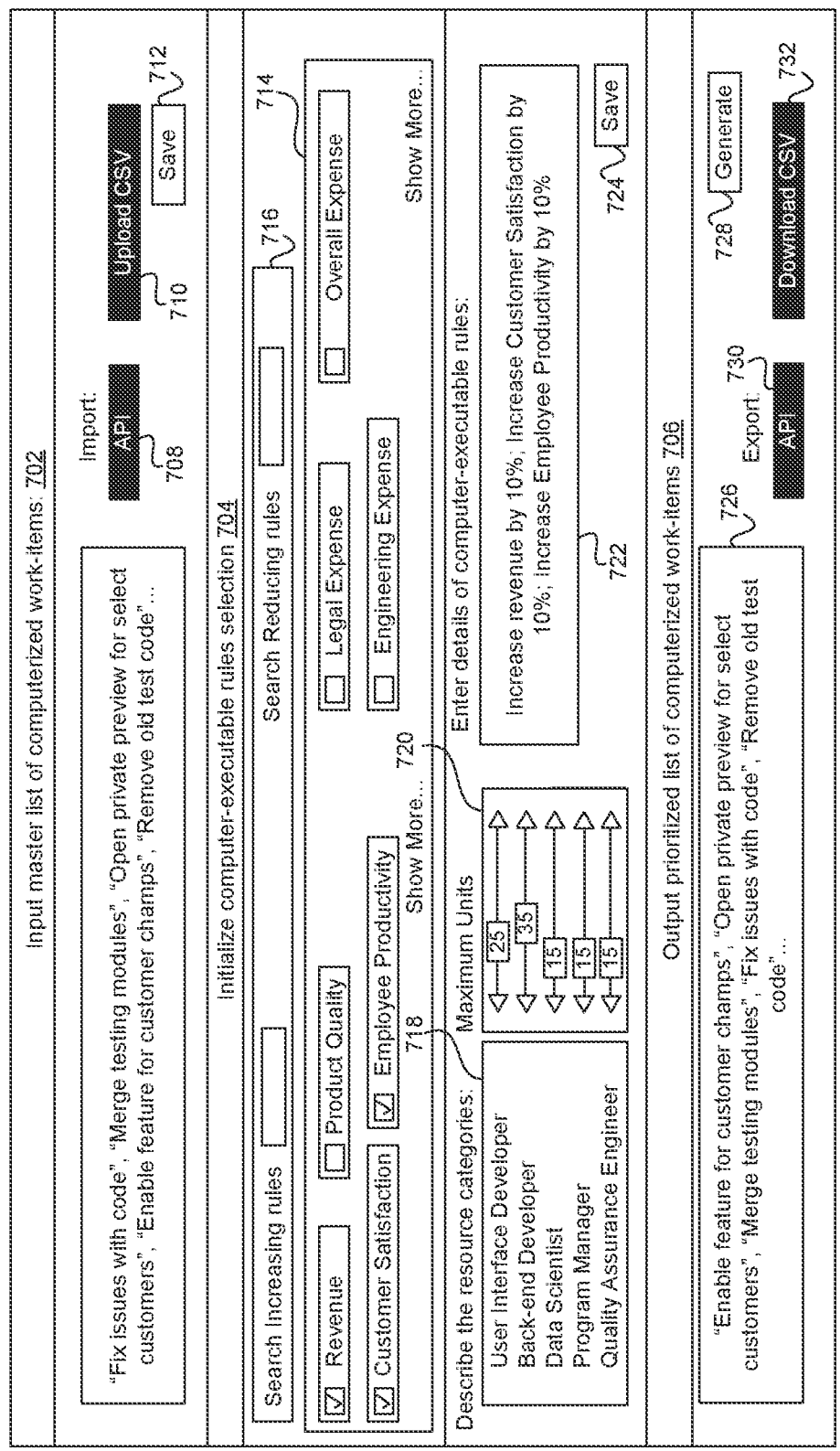
FIG. 7 is a block diagram illustrating a graphical user interface, in accordance with the embodiments herein.

FIG. 7 illustrates a graphical user interface 700 of the display device 23 of FIG. 6. The graphical user interface (GUI) 700 comprises an input master list pane 702, a rules initialization pane 704 and an output prioritized pane 706. The input master list pane 702 includes an application programming interface (API) icon 708 and an upload comma-separated value (CSV) icon 710 for importing the input master list of the plurality of computerized work-items. The API icon 708 and the upload CSV icon 710 may be illustrated in rectangular structured boxes and may be positioned on right side in the input master list pane 702. The GUI 700 allows the user to obtain, using the input master list pane 702 of the GUI 700, the input master list of a plurality of computerized work-items. The plurality of computerized work-items have an estimate of required resource units for each resource. In some embodiments, the input list of the plurality of computerized work-items may be obtained from a project management tool like Atlassian Jira® or Digital.ai Agility™ via the API icon 708. The input master list pane 702 includes a save icon 712 that may be configured and arranged in rectangular structured boxes and may be positioned on right side in the input master list pane 702. When a user clicks the save icon 712, the input master list of a plurality of computerized work-items is imported in the database 202.

The rules initialization pane 704 includes a checkbox icon 714 and a search and add icon 716 that causes searching of a computer-executable rule among a list of computer-executable rules. The list may include computer-executable rules as described in Table 3. The checkbox icon 714 has a box structure next to a presented computer-executable rule that receives a selection of the presented computer-executable rule when the user interacts with the checkbox icon 714. The search and add icon 716 may be positioned above computer-executable rules. The GUI 700 allows the user to process a selection of computer-executable rules using the search and add icon 716 based on inputs received at a rules initialization pane 704 of the GUI 700. The rules initialization pane 704 includes a resource category text field 718 that allows the user to enter a list of resource categories. The rules initialization pane 704 includes a slider bar icon 720 positioned next to each resource category. The slider bar icon 720 includes a sliding text box that can be adjusted left or right upon interaction by the user and allows the user to set the maximum resource unit limit for each of the plurality of resource categories. The rules initialization pane 704 includes a computer-executable rules description text box 722 that allows the user to enter details of the computer-executable rules. The computer-executable rules description text box 722 is populated automatically as the user selects rules to be added. The rules initialization pane 704 includes a save icon 724 that allows the user to obtain (a) a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules.

The output prioritized list of computerized work-items is displayed in a text box 726 that is included in the output prioritized pane 706. The output prioritized pane 706 includes a generate icon 728 that triggers traversing the sorted list of computerized work-items to generate the output prioritized list of computerized work-items for prioritizing work based on the set of quantified computer-executable rules, wherein computerized work-items are selected during traversal while ensuring (i) cumulative resource units required for each resource category to complete the output prioritized list of computerized work-items are less than the maximum resource unit limit for each resource category and (ii) cumulative expenses for expense sub-components in the output prioritized list of computerized work-items are less than the expense threshold. The output prioritized pane 706 includes an API icon 730 and a download CSV icon 732 for exporting the output prioritized list of the plurality of computerized work-items. The API icon 730 and the download CSV icon 732 may be configured and arranged in rectangular structured boxes and may be positioned on right side in the output prioritized pane 706. In an example, the input master list pane 702, the rules initialization pane 704, and the output prioritized pane 706 may be displayed simultaneously such that their respective icons/features (708-732) may also be displayed simultaneously for selection by a user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A non-transitory computer readable storage medium storing a sequence of instructions, which when executed by a processor, causes processing of an input master list of a plurality of computerized work-items to generate an output prioritized list of the plurality of computerized work-items selected from the input master list, for prioritizing work based on a set of quantified computer-executable rules, said sequence of instructions comprising:

(a) obtaining a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item;

(b) converting each of the plurality of contribution sub-components and expense sub-components that are estimated in buckets into a component numerical value using the bucket category to numerical value map;

(c) determining a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with a prioritized set of quantified computer-executable rules and a contribution sub-component or expense sub-component with either (i) a non-prioritized set of quantified computer-executable rules or (ii) no associated set of quantified computer-executable rules is assigned a lower priority than the plurality of contribution sub-components or expense sub-components that are associated with the prioritized set of quantified computer-executable rules, wherein the lower priority is derived from the default priority order;

(d) generating a plurality of tuples comprising contribution sub-components and expense sub-components for each of the plurality of computerized work-items of the input master list, wherein the contribution sub-components and the expense sub-components in a tuple are arranged based on the priority order;

(e) sorting the plurality of computerized work-items of the input master list in descending order of the plurality of tuples to obtain a sorted list of computerized work-items;

(f) traversing the sorted list of computerized work-items to generate the output prioritized list of the plurality of computerized work-items for prioritizing work based on the set of quantified computer-executable rules, wherein computerized work-items are selected during traversal while ensuring (i) cumulative resource units required for each resource category to complete the output prioritized list of the plurality of computerized work-items are less than the maximum resource unit limit for each resource category and (ii) cumulative expenses for expense sub-components in the output prioritized list of the plurality of computerized work-items are less than the expense threshold;

(g) shuffling tuples for all unselected computerized work-items of the sorted list, by moving a sub-component that is at a first position in the tuples to the end of a tuple, upon determining that a cumulative contribution of a contribution sub-component at a first position in the tuples for the output prioritized list of the plurality of computerized work-items exceeds the contribution threshold or a cumulative expense exceeds the expense threshold for an expense sub-component at a first position in the tuples;

(h) repeating steps (e) to (g) until (i) the cumulative resource units required for each resource category to complete the output prioritized list of the plurality of computerized work-items are greater than the maximum resource unit limit for each resource category, or (ii) cumulative contributions for each of the contribution sub-components in the output prioritized list of the plurality of computerized work-items are more than contribution thresholds, or (iii) the cumulative expenses for each of the expense sub-components in the output prioritized list of the plurality of computerized work-items have reached the expense threshold or (iv) computerized work-items in the sorted list available for selection have been exhausted, (i) obtaining, using an input master list pane of a graphical user interface, the input master list of a plurality of computerized work-items;

(j) processing a selection of computer-executable rules using a search icon and an add icon based on inputs received at a rules initialization pane of the graphical user interface; and (k) displaying, at an output prioritized list pane of the graphical user interface, the output prioritized list of the plurality of computerized work-items for prioritizing work based on quantified computer-executable rules.

2. The non-transitory computer readable storage medium storing a sequence of instructions of claim 1, wherein there is one uniform resource category with the plurality of computerized work-items having an estimate specified in number of resources.

3. The non-transitory computer readable storage medium storing a sequence of instructions of claim 1, wherein there is one uniform resource category with the plurality of computerized work-items having an estimate specified in time units.

4. The non-transitory computer readable storage medium storing a sequence of instructions of claim 1, which when executed by a processor, further causes determining a minimum number of required computerized work-items that satisfy the set of quantified computer-executable rules by:
  initializing the minimum number of required computerized work-items to a total number of computerized work-items;
  performing a plurality of iterations of steps (d) to (h) of claim 1, wherein each of the plurality of iterations is performed with a distinct priority order that is selected from all possible priority orders of the plurality of contribution sub-components and the plurality of expense sub-components, until a number of required computerized work-items for that iteration exceed the minimum number of required computerized work-items;
  updating the minimum number of required computerized work-items based on each completed iteration;
  obtaining a minimum number of required computerized work-items after all iterations corresponding to all possible priority orders have completed; and
  obtaining the list of prioritized computerized work-items for the iteration that resulted in the minimum number of required computerized work-items.

5. The non-transitory computer readable storage medium storing a sequence of instructions of claim 1, which when executed by a processor, further causes determining a set of computerized work-items requiring minimum engineering resources that satisfy the set of quantified computer-executable rules by:
  initializing a minimum number of resource units for each of the plurality of resource categories to the maximum resource unit limit for each of the plurality of resource categories;
  performing a plurality of iterations of steps (d) to (h) of claim 1, wherein each of the plurality of iterations is performed with a distinct priority order that is selected from all possible priority orders of the plurality of contribution sub-components and the plurality of expense sub-components, until required resource units for that iteration exceed the minimum number of resource units;
  updating the minimum number of resource units based on each completed iteration;
  obtaining a minimum number of required resource units after all iterations corresponding to all possible priority orders have completed; and
  obtaining a list of prioritized computerized work-items for an iteration that resulted in the minimum number of resource units.

6. The non-transitory computer readable storage medium storing a sequence of instructions of claim 1, which when executed by a processor, further causes tracking of progress of the plurality of computerized work-items by determining at least one of an overall contribution reached or an overall expense accumulated associated with the plurality of computerized work-items.

7. The non-transitory computer readable storage medium storing a sequence of instructions of claim 1, which when executed by a processor, further causes tracking of progress of the plurality of computerized work-items by:
  determining a deficit for each of the plurality of contribution sub-components by:
    determining an overall contribution reached by adding a first total of a component numerical value of contribution sub-components of computerized work-items that are fully completed with a second total of a product of a component numerical value of contribution sub-components of computerized work-items that are partially completed with their percentage of completion, and
    determining a delta between the contribution threshold and the overall contribution reached to obtain the deficit for each of the plurality of contribution sub-components;
  determining a balance for each of the plurality of expense sub-components by:
    determining an overall expense accumulated by adding a first total of a component numerical value of expense sub-components of computerized work-items that are fully completed with a second total of a product of a component numerical value of expense sub-components of computerized work-items that are partially completed with their percentage of completion, and
    determining a delta between the expense threshold and the overall expense accumulated to obtain the balance for each of the plurality of expense sub-components; and
  tracking of progress of the plurality of computerized work-items against the set of quantified computer-executable rules using the determined deficit and balance for each of the plurality of contribution and expense sub-components.

8. The non-transitory computer readable storage medium storing a sequence of instructions of claim 1, which when executed by a processor, further causes refining an estimate of a contribution sub-component in a bucket value or a numerical value of future planned computerized work-items using actual realized contributions obtained from at least one of (a) a usage telemetry, (b) a finer grained usage telemetry and (c) a quality telemetry.

9. The non-transitory computer readable storage medium storing a sequence of instructions of claim 1, which when executed by a processor, further causes refining an estimate of an expense sub-component in a bucket value or a numerical value of future planned computerized work-items based on actual expenses incurred in performing similar computerized work-items.

10. The non-transitory computer readable storage medium storing a sequence of instructions of claim 1, which when executed by a processor, further causes quantifying, a set of computer-executable rules that are specified using a percentage improvement over current base amounts, into a set of quantified computer-executable rules using a product of the percentage improvement and the current base amounts.

11. A software development device that causes processing of an input master list of a plurality of computerized work-items to generate an output prioritized list of the plurality of computerized work-items selected from the input master list, for prioritizing work based on a set of quantified computer-executable rules, the device comprising:

a processor;
a memory that stores a set of instructions, which when executed by the processor, performs:
(a) obtaining a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules that include a prioritized set of quantified computer-executable rules and a non-prioritized set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item;
(b) converting each of the plurality of contribution sub-components and expense sub-components that are estimated in buckets into a component numerical value using the bucket category to numerical value map;
(c) determining a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with the prioritized set of quantified computer-executable rules and a contribution sub-component or expense sub-component with either (i) the non-prioritized set of quantified computer-executable rules or (ii) no associated set of quantified computer-executable rules is assigned a lower priority than the plurality of contribution sub-components or expense sub-components that are associated with the prioritized set of quantified computer-executable rules, wherein the lower priority is derived from the default priority order;
(d) generating a plurality of tuples comprising contribution sub-components and expense sub-components for each of the plurality of computerized work-items of the input master list, wherein contribution sub-components and expense sub-components in a tuple are arranged based on the priority order;
(e) sorting the plurality of computerized work-items of the input master list in descending order of the plurality of tuples to obtain a sorted list of computerized work-items;
(f) traversing the sorted list of computerized work-items to generate the output prioritized list of the plurality of computerized work-items for prioritizing work based on the set of quantified computer-executable rules, wherein computerized work-items are selected during traversal while ensuring (i) cumulative resource units required for each resource category to complete the output prioritized list of the plurality of computerized work-items are less than the maximum resource unit limit for each resource category and (ii) cumulative expenses for expense sub-components in the output prioritized list of the plurality of computerized work-items are less than expense thresholds;
(g) shuffling tuples for all unselected computerized work-items of the sorted list, by moving a sub-component that is at a first position in the tuples to the end of a tuple, upon determining that cumulative contribution of a contribution sub-component at a first position in the tuples for the output prioritized list of the plurality of computerized work-items exceeds the contribution threshold or a cumulative expense exceeds the expense threshold for an expense sub-component at a first position in the tuples; and
(h) repeating steps (e) to (g) until (i) the cumulative resource units required for each resource category to complete the output prioritized list of the plurality of computerized work-items are greater than the maximum resource unit limit for each resource category, or (ii) cumulative contributions for each of the contribution sub-components in the output prioritized list of the plurality of computerized work-items are more than contribution thresholds, or (iii) the cumulative expenses for each of the expense sub-components in the output prioritized list of the plurality of computerized work-items have reached the expense threshold or (iv) computerized work-items in the sorted list available for selection have been exhausted; and
a graphical user interface that causes the steps of:
obtaining, using an input master list pane of the graphical user interface, the input master list of a plurality of computerized work-items;
processing a selection of computer-executable rules using a search icon and an add icon based on inputs received at a rules initialization pane of the graphical user interface; and
displaying, at an output prioritized list pane of the graphical user interface, an output prioritized list of computerized work-items for prioritizing work based on quantified computer-executable rules.

12. The software development device of claim 11, wherein there is one uniform resource category with the plurality of computerized work-items having an estimate specified in number of resources.

13. The software development device of claim 11, wherein there is one uniform resource category with the plurality of computerized work-items having an estimate specified in time units.

14. The software development device of claim 11, wherein the software development device determines a minimum number of required computerized work-items that satisfy the set of quantified computer-executable rules by:
initializing the minimum number of required computerized work-items to a total number of computerized work-items;
performing a plurality of iterations of steps (d) to (h) of claim 11, wherein each of the plurality of iterations is performed with a distinct priority order that is selected from all possible priority orders of the plurality of contribution sub-components and the plurality of expense sub-components, until a number of required computerized work-items for that iteration exceed the minimum number of required computerized work-items;

updating the minimum number of required computerized work-items based on each completed iteration;

obtaining the minimum number of required computerized work-items after all iterations corresponding to all possible priority orders have completed; and obtaining a list of prioritized computerized work-items for the iteration that resulted in the minimum number of required computerized work-items.

15. The software development device of claim 11, wherein the software development device determines a set of computerized work-items requiring minimum engineering resources that satisfy the set of quantified computer-executable rules by:

initializing a minimum number of resource units for each of the plurality of resource categories to the maximum resource unit limit for each of the plurality of resource categories;

performing a plurality of iterations of steps (d) to (h) of claim 11, wherein each of the plurality of iterations is performed with a distinct priority order that is selected from all possible priority orders of the plurality of contribution sub-components and the plurality of expense sub-components, until required resource units for that iteration exceed the minimum number of resource units;

updating the minimum number of resource units based on each completed iteration;

obtaining a minimum number of required resource units after all iterations corresponding to all possible priority orders have completed; and obtaining a list of prioritized computerized work-items for an iteration that resulted in the minimum number of resource units.

16. The software development device of claim 11, wherein the software development device tracks progress of the plurality of computerized work-items by determining at least one of an overall contribution reached or an overall expense accumulated associated with the plurality of computerized work-items.

17. The software development device of claim 11, wherein the software development device tracks progress of the plurality of computerized work-items by:

determining a deficit for each of the plurality of contribution sub-components by:

determining an overall contribution reached by adding a first total of a component value parameter of contribution sub-components of computerized work-items that are fully completed with a second total of a product of a component numerical value of contribution sub-components of computerized work-items that are partially completed with their percentage of completion, and determining a delta between the contribution threshold and the overall contribution reached to obtain the deficit for each of the plurality of contribution sub-components;

determining a balance for each of the plurality of expense sub-components by:

determining an overall expense accumulated by adding a first total of a component value parameter of expense sub-components of computerized work-items that are fully completed with a second total of a product of a component numerical value of expense sub-components of computerized work-items that are partially completed with their percentage of completion, and determining a delta between the expense threshold and the overall expense accumulated to obtain the balance for each of the plurality of expense sub-components; and tracking of progress of the plurality of computerized work-items against the set of quantified computer-executable rules using the determined deficit and balance for each of the plurality of contribution and expense sub-components.

18. The software development device of claim 11, wherein the software development device refines an estimate of a contribution sub-component in a bucket value or a numerical value of future planned computerized work-items using actual realized contributions obtained from at least one of (a) a usage telemetry, (b) a finer grained usage telemetry and (c) a quality telemetry.

19. The software development device of claim 11, wherein the software development device refines an estimate of an expense sub-component in a bucket value or a numerical value of future planned computerized work-items based on actual expenses incurred in performing similar computerized work-items.

20. The software development device of claim 11, wherein the software development device quantifies, a set of computer-executable rules that are specified using a percentage improvement over a current base amount, into a set of quantified computer-executable rules using a product of the percentage improvement and the current base amounts.

21. A method of processing of an input master list of a plurality of computerized work-items to generate an output prioritized list of the plurality of computerized work-items selected from the input master list, for prioritizing work based on a set of quantified computer-executable rules, the method comprising:

(a) obtaining a default priority order of (i) a plurality of contribution sub-components and (ii) a plurality of expense sub-components that are associated with the input master list of the plurality of computerized work-items, a bucket category to numerical value map that comprises mapping of a bucket category associated with the plurality of contribution sub-components and expense sub-components to a numerical value, a plurality of resource categories, a maximum resource unit limit for each of the plurality of resource categories, and the set of quantified computer-executable rules that include a prioritized set of quantified computer-executable rules and a non-prioritized set of quantified computer-executable rules, wherein each contribution sub-component associated with a computerized work-item has a contribution amount that counts towards a contribution threshold upon completion of the computerized work-item and each expense sub-component has an expense amount that counts towards an expense threshold upon completion of the computerized work-item;

(b) converting each of the plurality of contribution sub-components and expense sub-components that are estimated in buckets into a component numerical value using the bucket category to numerical value map;

(c) determining a priority order of each of the plurality of contribution sub-components and the plurality of expense sub-components based on the set of quantified computer-executable rules corresponding to the plurality of contribution sub-components and expense sub-components, wherein a contribution sub-component or expense sub-component at the top in the priority order corresponds to a set of quantified computer-executable rules having a highest priority among the plurality of contribution sub-components or expense sub-components that are associated with the prioritized set of quantified computer-executable rules and a contribution sub-component or expense sub-component with either (i) the non-prioritized set of quantified computer-executable rules or (ii) no associated set of quantified computer-executable rules is assigned a lower priority than the plurality of contribution sub-components or expense sub-components that are associated with the prioritized set of quantified computer-executable rules, wherein the lower priority is derived from the default priority order;

(d) generating a plurality of tuples comprising contribution sub-components and expense sub-components for each of the plurality of computerized work-items of the input master list, wherein contribution sub-components and expense sub-components in a tuple are arranged based on the priority order;

(e) sorting the plurality of computerized work-items of the input master list in descending order of the plurality of tuples to obtain a sorted list of computerized work-items;

(f) traversing the sorted list of computerized work-items to generate the output prioritized list of the plurality of computerized work-items for prioritizing work based on the set of quantified computer-executable rules, wherein computerized work-items are selected during traversal while ensuring (i) cumulative resource units required for each resource category to complete the output prioritized list of the plurality of computerized work-items are less than the maximum resource unit limit for each resource category and (ii) cumulative expenses for expense sub-components in the output prioritized list of the plurality of computerized work-items are less than expense thresholds;

(g) shuffling tuples for all unselected computerized work-items of the sorted list, by moving a sub-component that is at a first position in the tuples to the end of a tuple, upon determining that a cumulative contribution of the output prioritized list of the plurality of computerized work-items exceeds the contribution threshold for a contribution sub-component at a first position in the tuples or a cumulative expense exceeds the expense threshold for an expense sub-component at a first position in the tuples;

(h) repeating steps (e) to (g) until (i) the cumulative resource units required for each resource category to complete the output prioritized list of the plurality of computerized work-items are greater than the maximum resource unit limit for each resource category, or (ii) cumulative contributions for each of the contribution sub-components in the output prioritized list of the plurality of computerized work-items are more than contribution thresholds, or (iii) the cumulative expenses for each of the expense sub-components in the output prioritized list of the plurality of computerized work-items have reached the expense threshold or (iv) computerized work-items in the sorted list available for selection have been exhausted, (i) obtaining, using an input master list pane of a graphical user interface, the input master list of a plurality of computerized work-items;

(j) processing a selection of computer-executable rules using a search icon and an add icon based on inputs received at a rules initialization pane of the graphical user interface; and (k) displaying, at an output prioritized list pane of the graphical user interface, the output prioritized list of computerized work-items for prioritizing work based on quantified computer-executable rules.

22. The method of claim 21, wherein there is one uniform resource category with the plurality of computerized work-items having an estimate specified in number of resources.

23. The method of claim 21, wherein there is one uniform resource category with the plurality of computerized work-items having an estimate specified in time units.

24. The method of claim 21, further comprising determining a minimum number of required computerized work-items that satisfy the set of quantified computer-executable rules by:

initializing the minimum number of required computerized work-items to a total number of computerized work-items;

performing a plurality of iterations of steps (d) to (h) of claim 21, wherein each of the plurality of iterations is performed with a distinct priority order that is selected from all possible priority orders of the plurality of contribution sub-components and the plurality of expense sub-components, until a number of required computerized work-items for that iteration exceed the minimum number of required computerized work-items;

updating the minimum number of required computerized work-items based on each completed iteration;

obtaining the minimum number of required computerized work-items after all iterations corresponding to all possible priority orders have completed; and obtaining a list of prioritized computerized work-items for the iteration that resulted in the minimum number of required computerized work-items.

25. The method of claim 21, further comprising determining a set of computerized work-items requiring minimum engineering resources that satisfy the set of quantified computer-executable rules by:

initializing a minimum number of resource units for each of the plurality of resource categories to the maximum resource unit limit for each of the plurality of resource categories;

performing a plurality of iterations of steps (d) to (h) of claim 21, wherein each of the plurality of iterations is performed with a distinct priority order that is selected from all possible priority orders of the plurality of contribution sub-components and the plurality of expense sub-components, until required resource units for that iteration exceed the minimum number of resource units;

updating the minimum number of resource units based on each completed iteration;

obtaining a minimum number of required resource units after all iterations corresponding to all possible priority orders have completed; and obtaining a list of prioritized computerized work-items for the iteration that resulted in the minimum number of resource units.

26. The method of claim 21, further comprising tracking progress of the plurality of computerized work-items by determining at least one of an overall contribution reached or an overall expense accumulated associated with the plurality of computerized work-items.

27. The method of claim 21, further comprising tracking progress of the plurality of computerized work-items by:
- determining a deficit for each of the plurality of contribution sub-components by:
  - determining an overall contribution reached by adding a first total of a component numerical value of contribution sub-components of computerized work-items that are fully completed with a second total of a product of a component numerical value of contribution sub-components of computerized work-items that are partially completed with their percentage of completion, and
  - determining a delta between the contribution threshold and the overall contribution reached to obtain the deficit for each of the plurality of contribution sub-components;
- determining a balance for each of the plurality of expense sub-components by:
  - determining an overall expense accumulated by adding a first total of a component numerical value of expense sub-components of computerized work-items that are fully completed with a second total of a product of a component numerical value of expense sub-components of computerized work-items that are partially completed with their percentage of completion, and
  - determining a delta between the expense threshold and the overall expense accumulated to obtain the balance for each of the plurality of expense sub-components;

and tracking of progress of the plurality of computerized work-items against the set of quantified computer-executable rules using the determined deficit and balance for each of the plurality of contribution and expense sub-components.

28. The method of claim 21, further comprising refining an estimate of a contribution sub-component in a bucket value or a numerical value of future planned computerized work-items using actual realized contributions obtained from at least one of (a) a usage telemetry, (b) a finer grained usage telemetry and (c) a quality telemetry.

29. The method of claim 21, further comprising refining an estimate of an expense sub-component in a bucket value or a numerical value of future planned computerized work-items based on actual expenses incurred in performing similar computerized work-items.

30. The method of claim 21, further comprising quantifying, a set of computer-executable rules that are specified using a percentage improvement over a current base amount, into a set of quantified computer-executable rules using a product of the percentage improvement and the current base amounts.

* * * * *